US010611903B2

(12) United States Patent
Peoples et al.

(10) Patent No.: US 10,611,903 B2
(45) Date of Patent: Apr. 7, 2020

(54) HIGHLY FILLED POLYMER SYSTEMS

(71) Applicant: Metabolix, Inc., Woburn, MA (US)

(72) Inventors: Oliver P. Peoples, Arlington, MA (US); Johan Van Walsem, Acton, MA (US); Allen R. Padwa, Worcester, MA (US); Mansoor Akhthar Basheer Ahmed, Somerville, MA (US); Yelena Kann, Marblehead, MA (US); David Boudreau, Old Orchard Beach, ME (US)

(73) Assignee: CJ Cheiljedang Corporation (KR)

( * ) Notice: Subject to any disclaimer, the term of this patent is extended or adjusted under 35 U.S.C. 154(b) by 0 days.

(21) Appl. No.: 15/129,345

(22) PCT Filed: Mar. 27, 2015

(86) PCT No.: PCT/US2015/023186
§ 371 (c)(1),
(2) Date: Sep. 26, 2016

(87) PCT Pub. No.: WO2015/149029
PCT Pub. Date: Oct. 1, 2015

(65) Prior Publication Data
US 2017/0174878 A1 Jun. 22, 2017

Related U.S. Application Data

(60) Provisional application No. 61/971,137, filed on Mar. 27, 2014, provisional application No. 62/005,627, filed on May 30, 2014.

(51) Int. Cl.
| C08L 27/06 | (2006.01) |
| C08L 67/04 | (2006.01) |
| C08K 3/26 | (2006.01) |
| C08K 3/013 | (2018.01) |
| C08K 3/34 | (2006.01) |

(52) U.S. Cl.
CPC .............. *C08L 27/06* (2013.01); *C08K 3/013* (2018.01); *C08K 3/26* (2013.01); *C08K 3/34* (2013.01); *C08L 67/04* (2013.01); *C08K 2003/265* (2013.01)

(58) Field of Classification Search
CPC ........... C08L 27/06; C08L 67/04; C08K 3/34; C08K 3/26
USPC ................................. 524/451, 425, 567, 558
See application file for complete search history.

(56) References Cited

U.S. PATENT DOCUMENTS

| 2,744,095 A | 5/1956 | Caldwell |
| 3,274,143 A * | 9/1966 | Hostettler ............... C08L 33/20 524/310 |
| 3,563,971 A | 2/1971 | Wood et al. |
| 3,592,877 A | 7/1971 | Mullins |
| 3,904,579 A | 9/1975 | Braddicks |
| 3,954,839 A | 5/1976 | Dexter et al. |
| 3,962,377 A | 6/1976 | Spivack |
| 4,076,910 A | 2/1978 | Beck |
| 4,096,122 A | 6/1978 | Schade et al. |
| 4,130,533 A * | 12/1978 | Lamb ..................... C08G 63/60 524/111 |
| 4,132,707 A | 1/1979 | Borman |
| 4,145,466 A | 3/1979 | Leslie et al. |
| 4,393,167 A | 7/1983 | Holmes et al. |
| 4,463,113 A | 7/1984 | Nakahara et al. |
| 4,477,654 A | 10/1984 | Holmes et al. |
| 4,511,687 A | 4/1985 | Nakanishi et al. |
| 4,536,531 A | 8/1985 | Ogawa et al. |
| 4,562,245 A | 12/1985 | Stageman |
| 4,589,223 A | 5/1986 | Hastings |
| 4,596,886 A | 6/1986 | Hasegawa et al. |
| 4,617,373 A | 10/1986 | Pruett et al. |
| 4,655,768 A | 4/1987 | Marecki et al. |
| 4,749,750 A * | 6/1988 | Anzinger ............... C08G 63/06 525/190 |
| 4,797,440 A | 1/1989 | Schofield et al. |
| 4,804,691 A | 2/1989 | English et al. |
| 4,859,365 A | 8/1989 | Peninger |
| 4,889,892 A * | 12/1989 | Malfroid ................. C08L 27/06 525/186 |
| 4,946,930 A | 8/1990 | Takasa et al. |
| 4,968,611 A | 11/1990 | Traussnig et al. |
| 4,999,388 A | 3/1991 | Okamoto |
| 5,000,991 A | 3/1991 | Hayashi et al. |
| 5,043,192 A | 8/1991 | Jones et al. |
| 5,068,140 A | 11/1991 | Malhotra et al. |
| 5,110,844 A | 5/1992 | Hayashi et al. |
| 5,112,890 A | 5/1992 | Behrens et al. |
| 5,128,383 A | 7/1992 | Amano et al. |
| 5,134,028 A | 7/1992 | Hayashi et al. |
| 5,169,889 A | 12/1992 | Kauffman et al. |
| 5,191,037 A | 3/1993 | Doi et al. |
| 5,192,612 A | 3/1993 | Otter et al. |
| 5,202,205 A | 4/1993 | Malhota |

(Continued)

FOREIGN PATENT DOCUMENTS

| CA | 2234965 A1 | 5/1997 |
| CN | 1771291 A | 5/2006 |

(Continued)

OTHER PUBLICATIONS

International Search Report and Written Opinion for International Application No. PCT/US2015/023186 dated Jul. 1, 2015.

(Continued)

*Primary Examiner* — Rip A Lee
(74) *Attorney, Agent, or Firm* — Foley Hoag LLP

(57) ABSTRACT

Polymer systems comprising poly(vinyl chloride), a non-petroleum based filler, and a polyester additive, wherein the polymer system is highly filled, and articles made therefrom, are described. The high loading of filler (e.g., talc, calcium carbonate or a combination thereof) is achieved by incorporation of polyester additives such as polyhydroxyalkanoates. High filler loading without significant reduction of relevant material properties can be associated with cost savings and environmental benefits.

14 Claims, 2 Drawing Sheets

(56) References Cited

U.S. PATENT DOCUMENTS

| | | |
|---|---|---|
| 5,213,976 A | 5/1993 | Blauhut et al. |
| 5,252,646 A | 10/1993 | Iovine et al. |
| 5,312,850 A | 5/1994 | Iovine et al. |
| 5,342,868 A | 8/1994 | Kimura et al. |
| 5,382,679 A | 1/1995 | Galzigna |
| 5,387,623 A | 2/1995 | Ryan et al. |
| 5,395,919 A | 3/1995 | Lee et al. |
| 5,446,079 A | 8/1995 | Buchanan et al. |
| 5,480,394 A | 1/1996 | Ishikawa |
| 5,502,116 A | 3/1996 | Noda |
| 5,502,158 A | 3/1996 | Sinclair et al. |
| 5,516,565 A | 5/1996 | Matsumoto |
| 5,519,066 A | 5/1996 | McConnell et al. |
| 5,536,419 A | 7/1996 | Escalona et al. |
| 5,536,564 A | 7/1996 | Noda |
| 5,550,173 A | 8/1996 | Hammond et al. |
| 5,580,911 A | 12/1996 | Buchanan et al. |
| 5,599,858 A | 2/1997 | Buchanan et al. |
| 5,608,031 A | 3/1997 | Yau et al. |
| 5,614,576 A | 3/1997 | Rutherford et al. |
| 5,645,752 A | 7/1997 | Weiss et al. |
| 5,646,217 A | 7/1997 | Hammond |
| 5,656,367 A | 8/1997 | Iovine et al. |
| 5,658,646 A | 8/1997 | Takano et al. |
| 5,693,285 A | 12/1997 | Ishii et al. |
| 5,693,389 A | 12/1997 | Liggat |
| 5,700,344 A | 12/1997 | Edgington et al. |
| 5,711,842 A | 1/1998 | Kemmish |
| 5,750,605 A | 5/1998 | Blumenthal et al. |
| 5,753,343 A | 5/1998 | Braun et al. |
| 5,753,364 A | 5/1998 | Rutherford et al. |
| 5,753,724 A | 5/1998 | Edgington et al. |
| 5,789,536 A | 8/1998 | Liggat et al. |
| 5,800,897 A | 9/1998 | Sharma et al. |
| 5,821,299 A | 10/1998 | Noda |
| 5,853,876 A | 12/1998 | Takano et al. |
| 5,866,634 A | 2/1999 | Tokushige et al. |
| 5,894,062 A | 4/1999 | Liddell |
| 5,922,357 A | 7/1999 | Coombes et al. |
| 5,942,597 A | 8/1999 | Noda et al. |
| 5,952,088 A | 9/1999 | Tsai et al. |
| 5,952,405 A | 9/1999 | Schoenberg et al. |
| 5,973,038 A | 10/1999 | Weaver et al. |
| 5,973,100 A | 10/1999 | Asrar et al. |
| 5,985,952 A | 11/1999 | Levy |
| 5,994,478 A | 11/1999 | Asrar et al. |
| 6,018,004 A | 1/2000 | Warzelhan et al. |
| RE36,548 E | 2/2000 | Noda |
| 6,043,063 A | 3/2000 | Kurdikar et al. |
| 6,071,450 A | 6/2000 | Topolkaraev et al. |
| 6,083,729 A | 7/2000 | Martin et al. |
| 6,086,997 A | 7/2000 | Patel et al. |
| 6,087,471 A | 7/2000 | Kurdikar et al. |
| 6,096,809 A | 8/2000 | Lorcks et al. |
| 6,096,810 A | 8/2000 | Asrar et al. |
| 6,110,849 A | 8/2000 | Tsai et al. |
| 6,111,006 A | 8/2000 | Waddington |
| 6,111,060 A | 8/2000 | Gruber et al. |
| 6,114,042 A | 9/2000 | Warzelhan et al. |
| 6,135,987 A | 10/2000 | Tsai et al. |
| 6,156,852 A | 12/2000 | Asrar et al. |
| 6,174,990 B1 | 1/2001 | Noda |
| 6,177,062 B1 | 1/2001 | Stein et al. |
| 6,191,203 B1 | 2/2001 | Asrar et al. |
| 6,192,892 B1 | 2/2001 | Resler |
| 6,201,034 B1 | 3/2001 | Warzelhan et al. |
| 6,201,083 B1 | 3/2001 | Asrar et al. |
| 6,221,316 B1 | 4/2001 | Hanggi et al. |
| 6,228,934 B1 | 5/2001 | Horowitz et al. |
| 6,228,954 B1 | 5/2001 | Kaplan et al. |
| 6,235,815 B1 | 5/2001 | Loercks et al. |
| 6,235,816 B1 | 5/2001 | Lorcks et al. |
| 6,248,862 B1 | 6/2001 | Asrar et al. |
| 6,290,803 B1 | 9/2001 | Maksymkiw et al. |
| 6,303,677 B1 | 10/2001 | Warzelhan et al. |
| 6,307,003 B1 | 10/2001 | Grigat et al. |
| 6,319,352 B1 | 11/2001 | Simmler et al. |
| 6,340,580 B1 | 1/2002 | Horowitz |
| 6,342,304 B1 | 1/2002 | Buchanan et al. |
| 6,365,680 B1 | 4/2002 | Edgington et al. |
| 6,388,025 B1 | 5/2002 | Perego et al. |
| 6,423,250 B1 | 7/2002 | Blount |
| 6,472,497 B2 | 10/2002 | Loercks et al. |
| 6,472,502 B1 | 10/2002 | Jurgens et al. |
| 6,479,467 B1 | 11/2002 | Buchanan et al. |
| 6,515,054 B1 | 2/2003 | Matsushita et al. |
| 6,538,059 B1 | 3/2003 | Muller et al. |
| 6,552,124 B2 | 4/2003 | Wang et al. |
| 6,562,938 B2 | 5/2003 | Haile et al. |
| 6,579,934 B1 | 6/2003 | Wang et al. |
| 6,585,819 B2 | 7/2003 | Zhao |
| 6,592,892 B1 | 7/2003 | Williams |
| 6,620,869 B2 | 9/2003 | Asrar et al. |
| 6,623,854 B2 | 9/2003 | Bond |
| 6,699,931 B2 | 3/2004 | Kuo et al. |
| 6,703,115 B2 | 3/2004 | Hale et al. |
| 6,706,674 B2 | 3/2004 | Cincotta et al. |
| 6,706,942 B1 | 3/2004 | Zhao et al. |
| 6,709,848 B1 | 3/2004 | Martin et al. |
| 6,727,314 B2 | 4/2004 | Burghart et al. |
| 6,743,506 B2 | 6/2004 | Bond et al. |
| 6,746,766 B2 | 6/2004 | Bond et al. |
| 6,767,972 B1 | 7/2004 | Irick, Jr. et al. |
| 6,770,702 B1 | 8/2004 | Muller et al. |
| 6,780,911 B2 | 8/2004 | Zhong et al. |
| 6,783,854 B2 | 8/2004 | Bond |
| 6,803,443 B1 | 10/2004 | Ariga et al. |
| 6,808,795 B2 | 10/2004 | Noda et al. |
| 6,818,295 B2 | 11/2004 | Bond et al. |
| 6,818,723 B2 | 11/2004 | Sacripante |
| 6,830,810 B2 | 12/2004 | Bond |
| 6,838,037 B2 | 1/2005 | Autran et al. |
| 6,841,597 B2 | 1/2005 | Bastioli et al. |
| 6,844,390 B2 | 1/2005 | Kuo et al. |
| 6,880,320 B2 | 4/2005 | Olinger et al. |
| 6,906,164 B2 | 6/2005 | DeBruin |
| 6,918,927 B2 | 7/2005 | Bates et al. |
| 6,984,426 B2 | 1/2006 | Miksic et al. |
| 6,984,694 B2 | 1/2006 | Blasius, Jr. et al. |
| 7,052,580 B2 | 5/2006 | Trokhan et al. |
| 7,083,697 B2 | 8/2006 | Dao et al. |
| 7,098,292 B2 | 8/2006 | Zhao et al. |
| 7,144,632 B2 | 12/2006 | Hayes |
| 7,160,977 B2 | 1/2007 | Hale et al. |
| 7,166,654 B2 | 1/2007 | Fujita et al. |
| 7,172,814 B2 | 2/2007 | Hodson |
| 7,186,789 B2 | 3/2007 | Hossainy et al. |
| 7,196,157 B2 | 3/2007 | Bastioli et al. |
| 7,208,535 B2 | 4/2007 | Asrar et al. |
| 7,214,414 B2 | 5/2007 | Khemani et al. |
| 7,220,815 B2 | 5/2007 | Hayes |
| 7,225,518 B2 | 6/2007 | Eidenschink et al. |
| 7,241,832 B2 | 7/2007 | Khemani et al. |
| 7,241,838 B2 | 7/2007 | Shelby et al. |
| 7,252,980 B2 | 8/2007 | Walsem et al. |
| 7,284,401 B2 | 10/2007 | Larson et al. |
| 7,297,394 B2 | 11/2007 | Khemani et al. |
| 7,314,480 B2 | 1/2008 | Eidenschink et al. |
| 7,344,034 B2 | 3/2008 | Heinrich et al. |
| 7,354,653 B2 | 4/2008 | Germroth et al. |
| 7,354,656 B2 | 4/2008 | Mohanty et al. |
| 7,361,701 B2 | 4/2008 | Takahashi et al. |
| 7,368,503 B2 | 5/2008 | Hale |
| 7,368,511 B2 | 5/2008 | Hale et al. |
| 7,371,799 B2 | 5/2008 | Mather et al. |
| 7,459,517 B2 | 12/2008 | Fukui et al. |
| 7,470,290 B2 | 12/2008 | Rodrigues et al. |
| 7,569,273 B2 | 8/2009 | Bredt et al. |
| 7,592,019 B2 | 9/2009 | Drucks et al. |
| 7,597,804 B2 | 10/2009 | Duval et al. |
| 7,619,025 B2 | 11/2009 | Mohanty et al. |
| 7,642,301 B2 | 1/2010 | Uradnisheck |
| 7,683,117 B2 | 3/2010 | Moriyama et al. |
| 7,718,720 B2 | 5/2010 | Padwa |

(56) References Cited

U.S. PATENT DOCUMENTS

| | | | |
|---|---|---|---|
| 7,731,685 B2 | 6/2010 | Ragheb et al. | |
| 7,732,523 B2* | 6/2010 | Morimoto | B43L 19/0025 15/424 |
| 7,744,619 B2 | 6/2010 | Eidenschink | |
| 7,766,956 B2 | 8/2010 | Jang | |
| 7,781,539 B2 | 8/2010 | Whitehouse | |
| 7,803,149 B2 | 9/2010 | Bates et al. | |
| 7,867,422 B2 | 1/2011 | Nelson et al. | |
| 7,884,143 B2 | 2/2011 | Fournier et al. | |
| 7,928,167 B2 | 4/2011 | Whitehouse | |
| 7,973,101 B2 | 7/2011 | Aoyama et al. | |
| 8,003,719 B2 | 8/2011 | Padwa | |
| 8,003,731 B2 | 8/2011 | Seeliger et al. | |
| 8,026,301 B2 | 9/2011 | Sumanam | |
| 8,202,947 B2 | 6/2012 | Pfaadt et al. | |
| 8,283,435 B2 | 10/2012 | Whitehouse | |
| 8,487,023 B2 | 7/2013 | Whitehouse et al. | |
| 8,680,228 B2 | 3/2014 | Guo et al. | |
| 8,822,584 B2 | 9/2014 | Whitehouse | |
| 9,034,989 B2 | 5/2015 | Padwa et al. | |
| 9,115,259 B2* | 8/2015 | Thetford | C08J 3/203 |
| 9,346,948 B2* | 5/2016 | Whitehouse | C08J 3/005 |
| 9,464,187 B2* | 10/2016 | Kann | C08L 27/06 |
| 9,475,930 B2* | 10/2016 | Weinlein | C08L 27/06 |
| 9,505,927 B2* | 11/2016 | Kann | C08L 67/04 |
| 1,003,013 A1 | 7/2018 | Weinlein et al. | |
| 2002/0004578 A1 | 1/2002 | Shelby et al. | |
| 2002/0028857 A1 | 3/2002 | Holy | |
| 2002/0042481 A1 | 4/2002 | Marchessault et al. | |
| 2002/0043737 A1 | 4/2002 | Zhong et al. | |
| 2002/0058316 A1 | 5/2002 | Horowitz | |
| 2002/0068810 A1 | 6/2002 | Whitehouse et al. | |
| 2002/0077269 A1 | 6/2002 | Whitehouse et al. | |
| 2002/0143116 A1 | 10/2002 | Noda et al. | |
| 2002/0143136 A1 | 10/2002 | Noda et al. | |
| 2002/0156128 A1 | 10/2002 | Williams et al. | |
| 2003/0187149 A1 | 10/2003 | Schmidt et al. | |
| 2004/0063824 A1 | 4/2004 | Takagi et al. | |
| 2004/0092672 A1 | 5/2004 | Bastioli et al. | |
| 2004/0094474 A1 | 5/2004 | Heinrich et al. | |
| 2004/0103705 A1 | 6/2004 | Maria Langezaal | |
| 2004/0171757 A1 | 9/2004 | Moens et al. | |
| 2004/0213941 A1 | 10/2004 | Whitehouse | |
| 2004/0214927 A1 | 10/2004 | Nitzsche | |
| 2004/0220355 A1 | 11/2004 | Whitehouse | |
| 2005/0043680 A1 | 2/2005 | Segal et al. | |
| 2005/0043786 A1 | 2/2005 | Chu et al. | |
| 2005/0060028 A1 | 3/2005 | Horres et al. | |
| 2005/0069571 A1 | 3/2005 | Slivka et al. | |
| 2005/0079200 A1 | 4/2005 | Rathenow et al. | |
| 2005/0101713 A1 | 5/2005 | Lake et al. | |
| 2005/0107505 A1 | 5/2005 | Shinoda et al. | |
| 2005/0137304 A1 | 6/2005 | Strand et al. | |
| 2005/0154442 A1 | 7/2005 | Eidenschink et al. | |
| 2005/0182473 A1 | 8/2005 | Eidenschink et al. | |
| 2005/0209374 A1 | 9/2005 | Matosky et al. | |
| 2005/0209377 A1 | 9/2005 | Padwa | |
| 2005/0260723 A1 | 11/2005 | Yu | |
| 2005/0278021 A1 | 12/2005 | Bates et al. | |
| 2006/0032633 A1 | 2/2006 | Nguyen | |
| 2006/0036012 A1 | 2/2006 | Hayes et al. | |
| 2006/0036281 A1 | 2/2006 | Patterson et al. | |
| 2006/0073346 A1 | 4/2006 | Super et al. | |
| 2006/0110464 A1 | 5/2006 | Walls et al. | |
| 2006/0115515 A1 | 6/2006 | Pirhonen et al. | |
| 2006/0147412 A1 | 7/2006 | Hossainy et al. | |
| 2006/0159918 A1 | 7/2006 | Dugan et al. | |
| 2006/0247390 A1 | 11/2006 | Whitehouse et al. | |
| 2007/0021515 A1 | 1/2007 | Glenn et al. | |
| 2007/0021534 A1 | 1/2007 | Glenn et al. | |
| 2007/0027247 A1 | 2/2007 | Ueda et al. | |
| 2007/0042207 A1 | 2/2007 | Berger et al. | |
| 2007/0079945 A1 | 4/2007 | Noda et al. | |
| 2007/0088099 A1 | 4/2007 | Mentink et al. | |
| 2007/0166317 A1 | 7/2007 | Halbert | |
| 2007/0182041 A1 | 8/2007 | Rizk et al. | |
| 2007/0203283 A1 | 8/2007 | Scheer | |
| 2007/0213466 A1 | 9/2007 | Uradnisheck | |
| 2008/0071008 A1 | 3/2008 | Smillie et al. | |
| 2008/0071018 A1 | 3/2008 | Smillie et al. | |
| 2008/0146686 A1 | 6/2008 | Handa | |
| 2008/0281018 A1 | 11/2008 | Seeliger et al. | |
| 2008/0311813 A1 | 12/2008 | Ting et al. | |
| 2008/0315453 A1 | 12/2008 | Molitor et al. | |
| 2009/0018235 A1 | 1/2009 | Nascimento et al. | |
| 2009/0076191 A1 | 3/2009 | Aoyama et al. | |
| 2009/0137057 A1 | 5/2009 | Fraser et al. | |
| 2009/0162683 A1 | 6/2009 | Douard | |
| 2009/0215914 A1 | 8/2009 | Hirose et al. | |
| 2009/0221732 A1 | 9/2009 | Wernett | |
| 2009/0270280 A1 | 10/2009 | Zhang et al. | |
| 2009/0274885 A1 | 11/2009 | Egawa | |
| 2009/0312480 A1 | 12/2009 | Kohama | |
| 2010/0015544 A1 | 1/2010 | Agur et al. | |
| 2010/0041835 A1 | 2/2010 | Scherzer et al. | |
| 2010/0048767 A1 | 2/2010 | Nascimento et al. | |
| 2010/0089289 A1 | 4/2010 | Mahiat et al. | |
| 2010/0120307 A1 | 5/2010 | Noh | |
| 2010/0130652 A1 | 5/2010 | Padwa | |
| 2011/0124779 A1 | 5/2011 | Whitehouse et al. | |
| 2011/0136953 A1* | 6/2011 | Thetford | C08J 3/203 524/310 |
| 2011/0183143 A1 | 7/2011 | Tarrit et al. | |
| 2011/0193007 A1 | 8/2011 | Avakian | |
| 2011/0251349 A1 | 10/2011 | Padwa et al. | |
| 2011/0256398 A1 | 10/2011 | Kann et al. | |
| 2011/0293865 A1 | 12/2011 | Padwa et al. | |
| 2011/0306693 A1 | 12/2011 | Bosnyak et al. | |
| 2012/0041109 A1* | 2/2012 | Krishnaswamy | C08J 3/203 524/101 |
| 2013/0310473 A1 | 11/2013 | Becker et al. | |
| 2014/0051787 A1 | 2/2014 | Kann et al. | |
| 2014/0116749 A1* | 5/2014 | Shoemaker | C08L 27/06 174/110 SR |
| 2016/0108233 A1 | 4/2016 | Kann et al. | |
| 2017/0166740 A1* | 6/2017 | Weinlein | C08L 27/06 |
| 2017/0174878 A1 | 6/2017 | Peoples et al. | |

FOREIGN PATENT DOCUMENTS

| | | |
|---|---|---|
| CN | 1772810 A | 5/2006 |
| CN | 1922255 A | 2/2007 |
| CN | 101045810 A | 10/2007 |
| CN | 101120040 A | 2/2008 |
| CN | 101143962 A | 3/2008 |
| CN | 101175818 A | 5/2008 |
| CN | 101516998 A | 8/2009 |
| CN | 101918485 A | 12/2010 |
| CN | 102421819 A | 4/2012 |
| CN | 102532739 A | 7/2012 |
| CN | 102786751 A | 11/2012 |
| CN | 20131698580 A | 12/2013 |
| CN | 103571105 A | 2/2014 |
| CN | 103665688 A | 3/2014 |
| DE | 43 00 420 A1 | 7/1994 |
| DE | 4430415 A1 | 3/1996 |
| DE | 197 50 371 A1 | 5/1999 |
| EP | 0052460 B1 | 2/1985 |
| EP | 0300480 A2 | 1/1989 |
| EP | 0435 435 A2 | 7/1991 |
| EP | 0 450 777 A2 | 10/1991 |
| EP | 0 553 394 A1 | 8/1993 |
| EP | 0 609 713 A1 | 8/1994 |
| EP | 0 741 177 A2 | 11/1996 |
| EP | 0 826 803 A2 | 3/1998 |
| EP | 0 890 614 A1 | 1/1999 |
| EP | 0 989 159 A1 | 3/2000 |
| EP | 1 000 963 A1 | 5/2000 |
| EP | 1 193 294 A2 | 4/2002 |
| EP | 1 236 753 A1 | 9/2002 |
| EP | 1445282 A1 | 8/2004 |
| EP | 1 520 880 A2 | 4/2005 |
| EP | 1593705 A1 | 11/2005 |
| EP | 1 642 926 A1 | 4/2006 |

(56) References Cited

FOREIGN PATENT DOCUMENTS

| | | |
|---|---|---|
| EP | 1 657 280 A1 | 5/2006 |
| EP | 1 867 677 A1 | 12/2007 |
| EP | 1 870 432 A1 | 12/2007 |
| EP | 1881036 A1 | 1/2008 |
| EP | 1911809 A1 | 4/2008 |
| EP | 1950053 A1 | 7/2008 |
| FR | 2656620 A1 | 7/1991 |
| GB | 2 136 003 A | 9/1984 |
| GB | 2 442 333 A | 4/2008 |
| JP | 57030776 | 2/1982 |
| JP | 58-046277 | 10/1983 |
| JP | H07-285197 A | 10/1995 |
| JP | 11-302521 | 11/1999 |
| JP | 2001-302897 A | 10/2001 |
| JP | 2001-316658 A | 11/2001 |
| JP | 2002-532618 A | 10/2002 |
| JP | 2003092926 A | 4/2003 |
| JP | 2003-192884 A | 7/2003 |
| JP | 2004-512419 A | 4/2004 |
| JP | 2004-190025 A | 7/2004 |
| JP | 2004-190026 A | 7/2004 |
| JP | 2007077232 A | 3/2007 |
| JP | 2007-130763 A | 5/2007 |
| WO | WO-94/10257 A1 | 5/1994 |
| WO | WO-94/21743 A1 | 9/1994 |
| WO | WO-1994/028070 A1 | 12/1994 |
| WO | WO-95/02649 A1 | 1/1995 |
| WO | WO-95/10577 A1 | 4/1995 |
| WO | WO-95/20615 A1 | 8/1995 |
| WO | WO-96/05264 A1 | 2/1996 |
| WO | WO-96/08535 A1 | 3/1996 |
| WO | WO-96/09402 A1 | 3/1996 |
| WO | WO-97/04036 A1 | 2/1997 |
| WO | WO-9707153 A1 | 2/1997 |
| WO | WO-98/46782 A1 | 10/1998 |
| WO | WO-1999/14268 A1 | 3/1999 |
| WO | WO-99/023146 A1 | 5/1999 |
| WO | WO-99/23161 A2 | 5/1999 |
| WO | WO-99/46331 A1 | 9/1999 |
| WO | WO-00/37119 A1 | 6/2000 |
| WO | WO-00/53669 A1 | 9/2000 |
| WO | WO-01/15671 A2 | 3/2001 |
| WO | WO-2001/68890 A2 | 9/2001 |
| WO | WO-02/10303 A2 | 2/2002 |
| WO | WO-02/28969 A2 | 4/2002 |
| WO | WO-2002/34857 A2 | 5/2002 |
| WO | WO-02/50156 A2 | 6/2002 |
| WO | WO-02/059201 A1 | 8/2002 |
| WO | WO-02/077080 A1 | 10/2002 |
| WO | WO-02/085983 A1 | 10/2002 |
| WO | WO-02/090314 A1 | 11/2002 |
| WO | WO-02/094759 A1 | 11/2002 |
| WO | WO-2004/076582 A1 | 9/2004 |
| WO | WO-2004/076583 A1 | 9/2004 |
| WO | WO-2005/025570 A1 | 3/2005 |
| WO | WO-2005/066256 A1 | 7/2005 |
| WO | WO-2006/087346 A1 | 8/2006 |
| WO | WO-2007/099056 A1 | 9/2007 |
| WO | WO-2008/027046 A1 | 3/2008 |
| WO | WO-2008/036334 A2 | 3/2008 |
| WO | WO-2008/065571 A1 | 6/2008 |
| WO | WO-2008/073401 A1 | 6/2008 |
| WO | WO-2008/079262 A2 | 7/2008 |
| WO | WO-2008/098888 A2 | 8/2008 |
| WO | WO-2008/098889 A1 | 8/2008 |
| WO | WO-2008/130225 A2 | 10/2008 |
| WO | WO-2009/032864 A1 | 3/2009 |
| WO | WO-2009/077860 A2 | 6/2009 |
| WO | WO-2009/129499 A1 | 10/2009 |
| WO | WO-2009/137058 A1 | 11/2009 |
| WO | WO-2010/008445 A2 | 1/2010 |
| WO | WO-2010/008447 A1 | 1/2010 |
| WO | WO-2010/014630 A2 | 2/2010 |
| WO | WO-2010/043648 A1 | 4/2010 |
| WO | WO-2010/065053 A1 | 6/2010 |
| WO | WO-2010/075530 A1 | 7/2010 |
| WO | WO-2010/108076 A2 | 9/2010 |
| WO | WO-2010/118041 A1 | 10/2010 |
| WO | WO-2010/133560 A1 | 11/2010 |
| WO | WO-2011/031558 A2 | 3/2011 |
| WO | WO-2014017715 A1 | 1/2014 |
| WO | WO-2014/028943 A1 | 2/2014 |
| WO | WO-2014014337 A3 * | 3/2014 ............ C08L 67/00 |
| WO | WO-2014/194220 A1 | 12/2014 |
| WO | WO-2015/149029 A1 | 10/2015 |

OTHER PUBLICATIONS

International Preliminary Report on Patentability for International Application No. PCT/US2015/023186 dated Sep. 27, 2016.

Wiebking, "Increasing the Flexural Modulus of Rigid PVC at Elevated Temperatures," J Vinyl Addit Techn, 12: 37-40 (2006).

Garcia-Quesada et al., "Processability of PVC Plastisols Containing a Polyhydroxybutyrate-Polyhydroxyvalerate Copolymer," Journal of Vinyl and Additive Technology, 18(1): 9-16 (2012).

Final Office Action for U.S. Appl. No. 14/094,150, "Biobased Modifiers for Polyvinylchloride Blends," dated Apr. 1, 2016.

Final Office Action for U.S. Appl. No. 14/422,135, "Biobased Rubber Modifiers for Polymer Blends," dated Apr. 1, 2016.

Final Office Action for U.S. Appl. No. 10/783,958 dated Oct. 29, 2009.

Final Office Action for U.S. Appl. No. 10/783,995 dated Jan. 26, 2010.

Final Office Action for U.S. Appl. No. 12/991,404, "Biodegradable Polyester Blends," dated Mar. 19, 2013.

Final Office Action for U.S. Appl. No. 10/783,958 dated Apr. 28, 2008.

Final Office Action issued for U.S. Appl. No. 10/783,958 dated Apr. 7, 2006.

Final Office Action issued for U.S. Appl. No. 10/783,995 and dated Jul. 12, 2007.

Final Office Action issued for U.S. Appl. No. 10/783,995 dated Oct. 30, 2008.

Final Office Action issued in U.S. Appl. No. 10/783,958 and dated Dec. 1, 2010.

Final Office Action issued in U.S. Appl. No. 10/783,995 and dated Apr. 5, 2006.

Final Office Action issued in U.S. Appl. No. 11/022,954 and dated Dec. 23, 2008.

Final Office Action issued in U.S. Appl. No. 12/695,411 and dated Apr. 11, 2012.

Non-Final Office Action dated Jan. 22, 2013, U.S. Appl. No. 13/000,959.

Non-Final Office Action for U.S. Appl. No. 12/988/175, "Nucleating Agents for Polyhydroxyalkanoates," dated Jul. 3, 2012.

Non-Final Office Action for U.S. Appl. No. 13/391,894, "Toughened Polyhydroxyalkanoate Compositions," dated Apr. 4, 2015.

Non-Final Office Action for U.S. Appl. No. 14/422,135, "Biobased Rubber Modifiers for Polymer Blends," dated Sep. 3, 2015.

Non-final Office Action for U.S. Appl. No. 10/783,958 and dated Aug. 8, 2007.

Non-final Office Action for U.S. Appl. No. 10/783,958 dated Feb. 3, 2009.

Non-final Office Action for U.S. Appl. No. 10/783,958 dated Mar. 12, 2010.

Non-final Office Action for U.S. Appl. No. 10/783,958 dated Nov. 28, 2006.

Non-final Office Action for U.S. Appl. No. 10/783,995 dated Jul. 14, 2009.

Non-final Office Action issued for U.S. Appl. No. 10/783,958 dated Sep. 1, 2005.

Non-final Office Action issued for U.S. Appl. No. 10/783,995 and dated Jan. 10, 2008.

Non-final Office Action issued for U.S. Appl. No. 10/783,995 and dated Jan. 3, 2007.

Non-final Office Action issued in U.S. Appl. No. 11/772,574 dated Jun. 12, 2009.

(56) References Cited

OTHER PUBLICATIONS

Non-final Office Action issued in U.S. Appl. No. 12/695,411 and dated Oct. 21, 2011.
Non-final Office Action issued in U.S. Appl. No. 12/851,213 and dated Sep. 21, 2010.
Non-final Office Action issued in U.S. Appl. No. 10/783,958 dated Mar. 12, 2010.
Non-final Office Action issued in U.S. Appl. No. 10/783,995 and dated Aug. 24, 2005.
Non-final Office Action issued in U.S. Appl. No. 11/022,954 and dated Apr. 25, 2008.
Non-Final Rejection for U.S. Appl. No. 12/991,404, "Biodegradable Polyester Blends," dated Nov. 12, 2012.
Non-Final Rejection for U.S. Appl. No. 13/001,019, "Branched PHA Compositions, Methods for Their Production, and Use in Applications," dated Mar. 3, 2014.
Non-Final Rejection for U.S. Appl. No. 14/894,019, entitled: "Recyclate Blends," dated Sep. 29, 2017.
Notice of Allowance for U.S. Appl. No. 13/391,894, "Toughened Polyhydroxyalkanoate Compositions," dated Jan. 20, 2016.
Notice of Allowance for U.S. Appl. No. 12/991,404, "Biodegradable Polyester Blends," dated Apr. 28, 2014.
Notice of Allowance for U.S. Appl. No. 12/991,404, "Nucleating Agents for Polyhydroxyalkanoates," dated Mar. 18, 2013.
Notice of Allowance for U.S. Appl. No. 13/001,019, "Branched PHA Compositions, Methods for Their Production, and Use in Applications," dated Jan. 13, 2015.
Notice of Allowance for U.S. Appl. No. 14/094,150, "Biobased Modifiers for Polyvinylchloride Blends," dated Jun. 10, 2016.
Notice of Allowance for U.S. Appl. No. 14/422,135, "Biobased Rubber Modifiers for Polymer Blends," dated Jun. 14, 2016.
Notice of Allowance for U.S. Appl. No. 11/022,954 dated Sep. 25, 2009.
Notice of Allowance issued in U.S. Appl. No. 11/772,574 dated Dec. 23, 2009.
Notice of Allowance issued in U.S. Appl. No. 10/783,995 and dated Apr. 14, 2010.
Notice of Allowance issued in U.S. Appl. No. 12/851,213 and dated Dec. 22, 2010.
Notice of Allowance issued in U.S. Appl. No. 13/077,580 and dated May 19, 2011.
Requirement for Restriction for U.S. Appl. No. 13/391,894, "Toughened Polyhydroxyalkanoate Compositions," dated Sep. 8, 2014.
Requirement for Restriction for U.S. Appl. No. 13/132,57, "Production of Polyhydroxyalkanoate Foam," dated Jan. 29, 2013.
Abe et al., "Synthesis and Characterization of Poly[(R,S)-3-hydroxybutyrate-b-6-hydroxyhexanoate] as a Compatibilizer for a Biodegradabl Blend of Poly[(R)-3-hydroxybutyrate] and Poly(6-hydroxyhexanoate)", Macromolecules, 27(21):6012-6017 (1994).
Avella et al., "Poly(3-hydroxybutyrate)/poly(methyleneoxide) blends: thermal, crystallization and mechanical behaviour", Polymer, vol. 38, No. 25, pp. 6135-6143 (1997).
Blumm et al., "Miscibility, crystallization and melting of poly(3-hydroxybutyrate)/poly(L-lactide) blends", Polymer, vol. 36, No. 21, pp. 4077-4081 (1995).
Chen et al., "Miscibility and morphology of blends of poly(3-hydroxybutyrate) and poly(vinyl butyral)", Polymer, vol. 42, pp. 8407-8414 (2001).
Chiu et al., "Crystallization induced microstructure of crystalline/crystalline poly(vinylidenefluoride)/poly(3-hydroxybutyrate) blends probed by small angle X-ray scattering", Polymer, vol. 42, pp. 5749-5754 (2001).
Choe et al., "Miscibility of poly(3-hydroxybutyrate-co-3hydroxyvalerate) and poly(vinyl chloride) blends", Polymer, vol. 36, No. 26, pp. 4977-4982 (1995).
Chun et al., "Thermal properties of poly(hydroxybutyrate-co-hydroxyvalerate) and poly(e-caprolactone) blends", Polymer, vol. 41, pp. 2305-2308 (2000).

Class et al., "The Viscoelastic Properties of Rubber-Resin Blends. I. The Effect of Resin Structure", J. Appl. Poly Sci., vol. 30, No. 2, pp. 805-814 (1985).
Class et al., "The Viscoelastic Properties of Rubber-Resin Blends. II. The Effect of Resin Molecular Weight", J. Appl. Poly Sci., vol. 30, No. 2, pp. 815-824 (1985).
Class et al., "The Viscoelastic Properties of Rubber-Resin Blends. III. The Effect of Resin Concentration", J. Appl. Poly Sci., vol. 30, No. 2, pp. 825-842 (1985).
Communication pursuant to Article 94(3) EPC for European Application No. 09743045.8, dated Oct. 11, 2011.
Cox, M.K, "Recycling Biopol—Composting and Material Recycling," *Pure Appl. Chem.*, 32(4):607-612 (1995).
D'Haene et al., "Preparation and Characterization of a Branched Bacterial Polyester", Macromolecules, ACS 32(16): 5229-5235 (1999).
Dr. Chris Schwier, Metabolix, Inc., "Polyhydroxyalkanoates (PHA) Bioplastic Packaging Materials," SERDP Project WP-1478: Dated May 2010.
EP Communication for EP Patent Application No. 04713309.5 dated Nov. 24, 2005.
EP Communication for EP Patent Application No. 04713313.7 dated Nov. 29, 2005.
EP Communication for EP Patent Application No. 04713313.7 dated Jul. 28, 2006.
EP Communication issued in EP Patent Application No. 07076074.9 and dated Dec. 16, 2010.
EP Communication issued in European Patent Application No. 07076074.9 dated Jul. 15, 2009.
EP Search Report for EP Patent Application No. 07076074.9 dated May 13, 2008.
EP Search Report for EP Patent Application No. 08009261.2 dated Aug. 4, 2008.
European Communication issued in European Patent Application No. 07 076 074.9 and dated Sep. 1, 2011.
Examination Report issued in European Application No. 08009261.2 and dated Sep. 24, 2010.
Examiner's Report issued in European Patent Application No. 07 076 074.9 and dated Jun. 4, 2010.
Extended Search Report issued in European Patent Application No. 10007910.2 and dated Feb. 20, 2012.
Fujita et al., "Effects of Miscibility on Peel Strength of Natural-Rubber-Based Pressure-Sensitive Adhesives", J. Appl. Poly Sci., vol. 70, No. 4, pp. 777-784 (1998).
Fujita et al., "Effects of Miscibility on Probe Tack of Natural-Rubber-Based Pressure-Sensitive Adhesives", J. Appl. Poly Sci., vol. 70, No. 4, pp. 771-776 (1998).
Fujita et al., "Miscibility Between Natural Rubber and Tackifiers. I. Phase Diagrams of the Blends of Natural Rubber with Rosin and Terpene Resins", J. Appl. Poly Sci., vol. 64, No. 11, pp. 2191-2197 (1997).
Goh et al., "A completely miscible ternary blend system of poly(3-hydroxybutyrate), poly(ethylene oxide) and polyepichlorohydrin", Polymer, vol. 40, pp. 5733-5735 (1999).
Groeninckx, H. et al., "Crystallization of Poly(ethylene Terephthalate) Induced by Inorganic Compounds. I. Crystallization Behavior from the Glassy State in a Low-Temperature Region," *Journal of Polymer Science: Polymer Physics Edition*, vol. 12: 303-316 (1974). (4354.1019-002).
Gu-Su Jang et al., "Crystallization Behavior of Polypropylene with or without Sodium Benzoate as a Nucleating Agent," *Journal of Polymer Science: Part B: Polymer Physics*, vol. 39: 1001-1016 (2001). (4354.1019-002).
Hay et al., "Crystallisation of poly(3-hydroxybutyrate)/polyvinyl acetate blends", Polymer, vol. 41, pp. 5749-5757 (2000).
Hideki, A., et al., "Synthesis and Characterization of Poly[(R,S)-3-hydroxybutyrate-b-6-hydroxyhexanoate] as a Compatibilizer for a Biodegradable Blend of Poly[(R)-3-hydroxybutyrate] and Poly(6-hydroxyhexanoate)," Macromolecules, vol. 27, No. 21: 6012-6017 (1994).
Hobbs et al., "The effect of water on the crystallization of thin films of poly(hydroxybutyrate)", Polymer, vol. 38, No. 15, pp. 3879-3883 (1997).

(56) References Cited

OTHER PUBLICATIONS

International Preliminary Report on Patentability for PCT/US2014/040278, dated Dec. 1, 2015.
International Preliminary Report on Patentability for International Application No. PCT/US2010/030111, dated Oct. 20, 2011.
International Preliminary Report on Patentability for International Application No. PCT/US2010/047014; dated Mar. 8, 2012.
International Preliminary Report on Patentability for PCT/US2004/004991 dated Jan. 14, 2005.
International Preliminary Report on Patentability for PCT/US2004/043660 dated Jul. 3, 2006.
International Preliminary Report on Patentability for PCT/US2009/002808, dated Nov. 18, 2010.
International Preliminary Report on Patentability for PCT/US2009/003669, dated Jun. 7, 2011.
International Preliminary Report on Patentability for PCT/US2009/003675, dated Jan. 13, 2011.
International Preliminary Report on Patentability for PCT/US2009/003687; dated Jan. 13, 2011.
International Preliminary Report on Patentability for PCT/US2009/041023, dated Oct. 19, 2010.
International Preliminary Report on Patentability for PCT/US2009/069444, dated Jun. 29, 2011.
International Preliminary Report on Patentability, Application No. PCT/US 2013/055624 filed Aug. 19, 2013, entitled "Biobased Rubber Modifiers for Polymer Blends", Communication dated Feb. 26, 2015.
International Search Report and the Written Opinion of the International Searching Authority, or the Declaration for International Application No. PCT/US2009/069444, dated Jan. 6, 2010.
International Search Report and the Written Opinion of the International Searching Authority, or the Declaration for PCT/US2009/003669, dated Jan. 21, 2010.
International Search Report and Written Opinion for PCT/US2004/004991 dated Jul. 15, 2004.
International Search Report and Written Opinion for PCT/US2004/004992 dated Jul. 19, 2004.
International Search Report and Written Opinion issued in International Application No. PCT/US2013/055624, "Biobased Rubber Modifiers for Polymer Blends," dated Nov. 6, 2013.
International Search Report for PCT/US2014/040278, dated Dec. 4, 2014.
International Search Report for Int'l Application No. PCT/US2010/030111, dated Jun. 25, 2010.
International Search Report for International Application No. PCT/US/2009/041023, dated Jun. 24, 2009. (4354.1019-002).
International Search Report for International Application No. PCT/US2010/047014, dated May 13, 2011.
International Search Report for PCT/US2004/043660 dated Dec. 15, 2005.
International Search report for PCT/US2009/002808 dated Jul. 20, 2009.
International Search report for PCT/US2009/003675 dated Jan. 20, 2010.
International Search report for PCT/US2009/003687 dated Nov. 2, 2009.
Iriondo et al., "Thermal and infra-red spectroscopic investigations of a miscible blend composed of poly(vinyl phenol) and poly(hydroxybutyrate)", Polymer, vol. 36, No. 16, pp. 3235-3237 (1995).
Iwata, "Role of entanglement in crystalline polymers 1. Basic theory", Polymer, vol. 43, pp. 6609-6626 (2002).
Kim et al., "Miscibility and Pee Strength of Acrylic Pressure-Sensitive Adhesives: Acrylic Copolymer-Tackifier Resin Systems", J. Appl. Poly Sci., vol. 56, No. 2, pp. 201-209 (1995).
Kleinman W A et al.: "Status of gluthathione and other thiols and disulfides in human plasma." Biochemical Pharmacology. Jul. 1, 2000, vol. 60, No. 1, Jul. 1, 2000, pp. 19-29.

Iannace et al., "Poly(3-hydroxybutyrate)-co-(3-hydroxyvalerate)/Poly-L-Lactide Blends: Thermal and Mechanical Properties" Journal of Applied Polymer Science, 54:1525-1535 (1994).
Lotti, N., et al, "Binary blends of microbial poly (3-hydroxybutyrate) with polymethacrylates," Polymer, 34(23): 4935-4940 (1993).
Luo et al., The effect of molecular weight on the lamellar structure, thermal and mechanical properties of poly(hydroxybutyrate-co-hydroxyvalerates), Polymer, vol. 43, pp. 4159-4166 (2002).
Maekawa et al., "Miscibility and tensile properties of poly ((3-hydroxybutyrate)-cellulose propionate blends", Polymer, vol. 40, pp. 1501-1505 (1999).
Mallarde et al., "Hydrolytic Degradability of poly(3-hydroxyoctanoate) and of a poly(3-hydroxyoctanoate)/poly(R,S-lactic acid) Blend", Polymer, 39(15):3387-3392 (1998).
Martin D P et al: "Medical applications of poly-4-hydroxybutyrate: A strong flexible absorbable biomaterial", Biochemical Engineering Journal, Elsevier, Amsterdam, NL, vol. 16, No. 2, 1, pp. 97-105, (2003).
McNally et al., "Polyamide-12 layered silicate nanocomposites by melt blending", Polymer, vol. 44, pp. 2761-2772 (2003).
Miguel et al., "Blends of bacterial poly(3-hydroxybutyrate) with synthetic poly(3-hydroxybutyrate) and poly(epichlorohydrin): transport properties of carbon dioxide and water vapour", Polymer, vol. 42, pp. 953-962 (2001).
Mizumachi et al., "Theory of Tack of Pressure-Sensitive Adhesive. II", J. Appl. Poly Sci., vol. 37, No. 11, pp. 3097-3104 (1989).
Na, Y.H, et al. "Phase-separation enhanced enzymatic degradation of atactic poly (R,S-3-hydroxybutyrate) in the blends with poly(methyl methacrylate)," Polymer Degradation and Stability, 79:535-545 (2003).
Nakajima et al., Rheology, Composition, and Peel-Mechanism of Block Copolymer-Tackifier-Based Pressure Sensitive Adhesives, J. Appl. Poly Sci., vol. 44, No. 8, pp. 1437-1456 (1992).
Natureworks, "Technology Focus Report: Polylactic Acid Containing Fillers and Fibers," Internet Citation, pp. 1-5, Sep. 19, 2007. (Retrieved from the Internet: URL:http://www.natureworks11c.com/product-and-applications/ingeo-biopolymer/technical-publications/I/media/Files/Fillers-and Fibers-Technology).
Ohkoshi et al., Miscibility and solid-state structures for blends of poly[(S.)-lactide] with atactic polyKR,S)-3-hydroxybutyrater, Polymer, vol. 41, pp. 5985-5992 (2000).
Paul et al., "New nanocomposite materials based on plasticized poly(L-lactide) and organo-modified montmorillonites: thermal and morphological study", Polymer, vol. 44, pp. 443-450 (2003).
Purdie J. W., "Gamma-Radiolysis of Cysteine-Cysteamine Disulfide in Aqueous solution" Canadian J. of Chemistry, vol. 49, 1971, pp. 725-730.
Qiu et al., "Melting behaviour of poly(butylenes succinate) in miscible blends with poly(ethylene oxide)", Polymer, vol. 44, pp. 3095-3099 (2003).
Qiu et al., "Miscibility and crystallization of poly(ethylene oxide) and poly(e-caprolactone) blends", Polymer, vol. 44, pp. 3101-3106 (2003).
Qiu et al., "Poly (hydroxybutyrate)/poly(butylenes succinate) blends: miscibility and nonisothermal crystallization", Polymer, vol. 44, pp. 2503-2508 (2003).
Saito et al., Microbial Synthesis and Properties of Poly(3-hydroxybutyrate-co-4-hydroxybutyrate), Polymer International, 39 (1996) pp. 169-174.
Salamone J., ed., Polymeric Materials Encyclopedia, vol. 6, p. 4307, 1996.
Sato S. et al.: "Indentification of thioether intermediates in the reductive transformation of gonyautoxins into saxitoxins by thiols." Bioorganic & Medicinal Chemistry Letters. Aug. 21, 2000, vol. 10, No. 16, pp. 1787-1789.
Scandola et al., "Polymer Blends of Natural Poly(3-hydroxybutyrate-co-3-hydroxyvalerate) and a Synthetic Atactic Poly(3-hydroxybutyrate). Characterization and Biodegradation Studies.", Macromolecules, 30(9):2568-2574 (1997).
Siciliano et al., "Miscibility and Thermal and Crystallization Behaviors of Pold(D-(--)-3-hydroxybutyrate/Atactic Poly(methyl methacrylate) Blends," Macromolecules, 28: 8065-8072 (1995).

(56) References Cited

OTHER PUBLICATIONS

Supplementary European Search Report for EP Patent Application No. 04815630.1 dated Jan. 22, 2007.
Supplementary European Search Report on International Application No. 10815895.7; dated Feb. 21, 2013.
Tsuji et al., "Blends of Crystalline and Amorphous Poly(lactide) III. Hydrolysis of Solution-cast Blend Films" *Journal of Applied Polymer Science*, 64(7):855-863 (1997).
Whitehouse R. S. "Contact Adhesives", Critical Reports on Applied Chemistry, Synthetic Adhesives & Sealants, Chapter 1, vol. 16, edited by WC Wake (1987).
Willett et al., "Processing and properties of extruded starch/polymer foams", Polymer, vol. 43, pp. 5935-5947 (2002).
Written Opinion of the International Searching Authority for PCT/US2009/002808, dated Nov. 6, 2010.
Xia, Z, et al., "The Reinforcement of Poly (lactic acid) Using High Aspect Ratio Calcium Carbonate Based Mineral Additive," *Plastic Encounter at Antec 2007*, vol. 3, pp. 1549-1553, Jan. 1, 2007.
Xu et al., "In situ FTIR study on melting and crystallization of polyhydroxyalkanoates", Polymer, vol. 43, pp. 6893-6899 (2002).
Yoon et al., "Compatibility of poly(3-hydroxybutyrate)/poly(ethylene-co-vinyl acetate) blends", Polymer, vol. 39, No. 12, pp. 2479-2487 (1998).
Yoshie et al., Temperature dependence of cocrystallization and phase segregation in blends of poly(3-hydroxybutyrate) and poly(3-hydroxybutyrate-co-3-hydroxyvalerate), Polymer, vol. 42, pp. 8557-8563 (2001).
Yuan et al., "Miscibility and transesterification of phenoxy with biodegradable poly(3-hydroxybutyrate)", Polymer, vol. 39., vol. 10, pp. 1893-1897 (1998).
Zhang et al., "Miscibility, melting and crystallization behavior of two bacterial polyester/poly(epichlorohydrin-co-ethylene oxide) blend systems", Polymer, vol. 41, pp. 1429-1439 (2000).

\* cited by examiner

HIGHLY FILLED POLYMER SYSTEMS

RELATED APPLICATION

This application is the U.S. National Stage of International Application No. PCT/US2015/023186, filed Mar. 27, 2015, which designates the U.S., published in English, and claims the benefit of U.S. Provisional Application No. 61/971,137, filed on Mar. 27, 2014 and 62/005,627, filed May 30, 2014. The entire teachings of the above applications are incorporated herein by reference.

BACKGROUND OF THE INVENTION

Plastics have become an indispensable part of modern life. Their versatility in terms of physical properties, formability and cost has made plastics the material of choice for many product applications. Plastics have also become a symbol of disposability and hence an inevitable object of concern given heightened public awareness of environmental issues providing strong drivers to recycle or reuse post-consumer plastic materials and avoid disposing of them in landfills or the environment.

Polyvinylchloride (PVC) is one of the most important commodity plastics and is used in a very wide range of applications from rigid to flexible applications. In order to deliver PVC products to this wide array of end uses it is one of the most highly formulated plastics in use and a PVC part can contain up to 50% or more of other materials. These other materials can be collectively referred to additives and includes everything from mineral fillers, plasticizers, processing aids, UV stabilizers oxidative stabilizers etc.

The vast majority of plastics materials (including PVC) are made from depleting petroleum fossil resources providing a strong driver to not only reduce their consumption but to extend the use of these materials by adding non-petroleum based fillers. When using fillers such as mineral fillers like talc or calcium carbonate in polymer formulations such as PVC formulations to reduce overall system costs, the following needs to be considered. The higher the level of filler that is used, the more impaired the physical properties of the final products. In addition with fillers, in some cases it would be desirable to use higher loading of fillers in a PVC formulation not just to reduce cost but to provide some useful physical attribute in the final product. However, the higher the level of filler used the more difficult and costly it is to extrude such PVC formulations into finished products.

Therefore, there is a need to achieve higher filler loading in polymer systems, particularly, without impairing relevant physical properties of the final polymer products.

SUMMARY OF THE INVENTION

It has been found that polyester additives described herein can enable higher filler loading in the polymers systems of the invention. Specifically, the polymer systems of the present invention comprise poly(vinyl chloride), a non-petroleum based filler, and a polyester additive. It has been found that the use of polyester additives such as PHA in the polymer systems of the invention allow higher loading with non-petroleum based filler in the polymer system, which can lead to substantial benefits including cost-savings and environmental benefits associated, for example, with reduced usage of petroleum based plastics such as PVC. In addition, the use of a polyester additive in combination with a high filler loading can substantially reduce or entirely replace the standard commercial PVC additives such as acrylic copolymers, monomeric ester lubricants and phthalate plasticizers while simultaneously improving the rheological, thermal and mechanical properties of rigid, semi-rigid and flexible PVC formulations.

As used herein the term "PHA" includes homopolymers of a polyhydroxyalkanoate, copolymers of a polyhydroxyalkanoate, and blends of polyhydroxyalkanoates (e.g., a blend of at least one homopolymer and at least one copolymer, two or more homopolymers, or two or more copolymers).

One embodiment of the present invention is a polymer system comprising poly(vinyl chloride), a non-petroleum based filler, and a polyester additive, wherein the polymer system is highly filled.

A further embodiment of the present invention is an article comprising/or being made from the polymer system of the present invention.

When the polyester additives of the present invention are blended with PVC, it can enable higher loadings of non-petroleum based filler thereby lowering manufacturing costs and decreasing the environmental impact of polymer waste which would otherwise be disposed of in landfills or burned. Polyester additives such as the PHAs are further generally produced using renewable starting materials and therefore also have a positive impact on the environment. The polyester additives of the present invention allow higher loadings of non-petroleum based fillers while still delivering acceptable and in many instances improved extrusion processing characteristics or final product physical properties than those same PVC polymer systems without the presence of the polyester additives.

In the case of highly filled PVC polymer systems (also referred to herein as formulations) the polyester additives are present from about 1 pph PVC to about 50 pph PVC, where pph is defined as parts-per-hundred poly(vinyl chloride). For example, from about 2 pph to about 50 pph PVC, from about 3 pph to about 50 pph PVC, from about 4 pph to about 50 pph PVC, from about 5 pph to about 50 pph PVC, from about 10 pph to about 50 pph PVC, from about 15 pph to about 50 pph PVC, from about 25 pph to about 50 pph PVC, from about 35 pph to about 50 pph PVC, and from about 45 pph to about 50 pph PVC More specifically, the polyester additives are present in the polymer system in at least 1 pph PVC, at least 2 pph PVC, at least 3 pph PVC, at least 4 pph PVC, at least 5 pph PVC, at least 6 pph PVC, at least 7 pph PVC, at least 8 pph PVC, at least 9 pph PVC, at least 10 pph PVC, at least 15 pph PVC, at least 20 pph PVC, at least 25 pph PVC, at least 30 pph PVC, at least 35 pph PVC, at least 40 pph PVC, at least 45 pph PVD, or at least 50 pph PVC. In one embodiment, the PVC is rigid and the amount of polyester additive present in the system can range from about 1 pph PVC to about 10 pph PVC, such as 1, 2, 3, 4, 5, 6, 7, 8, 9 or 10 pph PVC.

In another embodiment, the PVC is semi-rigid and the amount of polyester additive present in the system can range from about 5 pph PVC to about 15 pph PVC.

In yet another embodiment, the PVC is flexible and the amount of polyester additive present in the system can range from about 25 pph PVC to about 50 pph PVC.

As defined herein polyester additives suitable for practicing the disclosed invention can be aliphatic or aliphatic/aromatic polyesters. Suitable polyester additives can be produced by a number of different polymerization technologies including: biological synthesis inside living cells as is the case for polyhdyroxyalkanoate (PHA) biopolymers or can be produced by traditional chemical synthetic approaches.

The polyhydroxyalkanoate biopolymers preferably contain one or more units of the following formula:

—OCR¹R²(CR³R⁴)$_n$CO— wherein n is 0 or an integer; and wherein R¹, R², R³, and R⁴ are independently selected from saturated and unsaturated hydrocarbon radicals, and hydrogen atoms.

The polyhydroxyalkanoates are preferably copolymers and in-particular co-polymers of 3-hydroxybutyrate (PHB) polymerized with one or more comonomers selected from the group lactic acid (LA), glycolic acid (GA), 2-hydroxybutyrate (2HB), 3-hydroxypropionate (3HP), 4-hydroxybutyrate (4HB), 3-hydroxyvalerate (3HV), 4-hydroxyvalerate (4HV), 5-hydroxyvalerate (5HV), 3-hydroxyhexanoate (3HH), 6-hydroxyhexanoate (6HH) 3-hydroxyoctanoate (3HO) or 3-hydroxydecanoate (3HD). Preferably the distribution of the monomers in the copolymers is random. These materials are collectively referred to as PHB copolymers. Examples of PHA copolymers include poly 3-hydroxybutyrate-co-3-hydroxypropionate (hereinafter referred to as PHB3HP), poly 3-hydroxybutyrate-co-lactic acid (hereinafter referred to as PHBLA) poly 3-hydroxybutyrate-co-4-hydroxybutyrate (hereinafter referred to as P3HB4HB), poly 3-hydroxybutyrate-co-4-hydroxyvalerate (hereinafter referred to as PHB4HV), poly 3-hydroxybutyrate-co-3-hydroxyvalerate (hereinafter referred to as PHB3HV), poly 3-hydroxybutyrate-co-3-hydroxyhexanoate (hereinafter referred to as PHB3HH) and poly 3-hydroxybutyrate-co-5-hydroxyvalerate (hereinafter referred to as PHB5HV) and poly 3-hydroxybutyrate-co-6-hydroxyhexanoate (hereinafter referred to as PHB6HH). poly 3-hydroxybutyrate-co-3-hydroxyoctanoate (hereinafter referred to as PHB3HO). Other PHAs useful for practicing this invention may contain a range of 3-hydroxymonomers selected from 3HH, 3HO, 3HD etc. and are typically produced by fermentation of vegetable oils or fatty acids. It is well known that the ratio of monomers in the PHA copolymers can be controlled to produce a wide range of physical properties as indicated by a glass transition temperature range from 5° C. to −50° C. and a range of crystallinity from greater than 60% to completely amorphous. The PHA copolymers can be used alone or in blends with different PHAs or other polyesters. With regard to PVC formulations, given that the formulations are used for both flexible applications like for example films, tubing and packaging as well as rigid application such as windows and doors, decking, fencing and the like the level of co-monomer present in the copolymer can be tailored.

The polyester additive of the present invention can also include chemically synthesized polyesters which can be produced, for example, by ring-opening polymerization of lactones or condensation polymerization of diols and diacids. Suitable lactones include dilactide, beta-propiolactone, beta-butyrolactone, gamma-butyrolactone, gamma-valerolactone, delta valerolactone, and caprolactone. These lactones can be polymerized individually or in combinations to produce a range of polyester copolymers. In another embodiment, the aliphatic/aromatic polyester comprises various copolyesters of polyethylene terephthalate (PET) or polybutylene terephthalate (PBT) with aliphatic diacids, diols, or hydroxy acids which are incorporated into the polymer backbone to render the copolyesters biodegradable or compostable. Examples of suitable aliphatic/aromatic polyesters include aliphatic polyesters which can be prepared from diacids and diol monomers. The diacids comprise such monomers as succinic acid, glutaric acid, adipic acid, sebacic acid, azealic acid, or their derivatives, e.g., alkyl esters, acid chlorides, or their anhydrides. The diols comprise such monomers as ethylene glycol, propylene glycol, 1,3-propanediol, 1,4-butanediol, 1,6-hexanediol, or 1,4-cyclohexanedimethanol. Additionally, the aliphatic polyesters include those prepared by ring-opening polymerization of cyclic monomers or lactones. In some cases it is useful to use a chemically polymerized aliphatic or aliphatic/aromatic polyester which is biodegradable as defined by ASTM test D6400.

Typical non-petroleum based fillers include calcium carbonate, kaolin, carbon black, carbon fibers, aluminum hydroxide, aluminum trihydrate, talc, dolomite, barium ferrite, wollastonite, wood flour, glass fibers, nanoclay, starch (crystalline and amorphous), calcium sulfate, glass spheres, mica, silica, feldspar, nephelline, graphite, boron nitride, silicon carbide, silicon nitride, aluminum oxide, titanium dioxide, zinc oxide, iron oxide, magnesium oxide or zirconium oxide. More typical non-petroleum based fillers for PVC include calcium carbonate and talc. It is believed that the polyester additives can enable higher filler load acceptance by promoting filler wetting, as well as acting as lubricants, torque reducers and fusion promoters, thereby reducing torque in the extruder barrel and improving the extrusion processing characteristics enabling improved physical properties of PVC/filler composites. Therefore, the polyester additives can be used as a processing aid/impact modifier/thermal stabilizers/compatibilizer in PVC/talc and PVC/high CaCO$_3$ composites and PVC alloys including PVC/acrylonitrile-butadiene-styrene (ABS) or styrene-acrylonitrile (SAN)/talc reinforced alloys. In a particular embodiment, the non-petroleum based filler is selected from talc, calcium, carbonate or a combination thereof. In a more particular embodiment, the filler is talc. In another more particular embodiment the filler is calcium carbonate. In another particular embodiment, the filler is a combination of talc and calcium carbonate.

The polymer systems of the present invention can further contain other additives such as plasticizers, branching agents, nucleating agents, thermal stabilizers, co-stabilizers or antioxidants.

The polyester additive can be a single homopolymer or copolymer or can contain a blend of various homopolymers and/or copolymers.

The polymer systems of the present invention can be used, for example, to produce films, articles (e.g., an article that is used in medical treatments), sheets or multilayer laminates, and rigid forms such as decking, fencing, window frame. Polyester additives suitable for practicing the disclosed invention can in some cases be produced using renewable starting materials and thereby have a more positive impact on the environment. It is to be understood that both the foregoing general description and the following detailed description are exemplary and explanatory only and are intended to provide a further explanation of the present invention, as claimed.

DETAILED DESCRIPTION OF THE INVENTION

Figure 1:
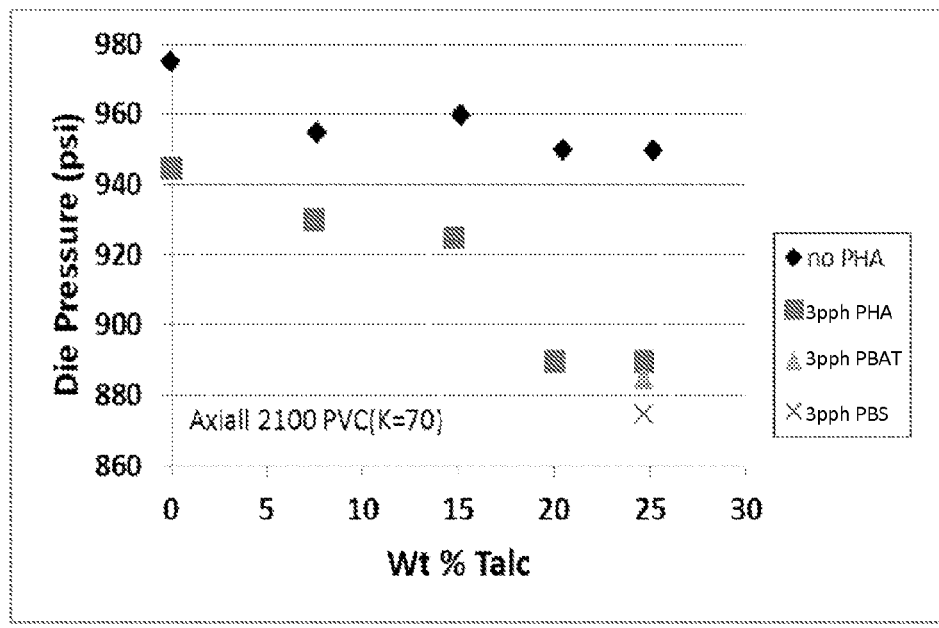
FIG. 1 is a plot of Die Pressure versus weight percent talc in PVC for formulations having 3 pph PVC of the indicated polyester additive. The plot shows that with increasing talc concentrations, the die pressure during extrusion decreased when the polyester additives were part of the formulation.

The polymer systems of the present invention comprise poly(vinyl chloride), a non-petroleum based filler, and a polyester additive. The polymer systems of the present invention are highly-filled. It has been found that the use of polyester additives in the polymer systems of the invention allows higher loading of non-petroleum based filler in the petroleum system. It has also been found that the polyester additives improve the processability of PVC (reduced torque and die pressure), improve the fusion characteristics of the PVC (promotes fusion at lower temperatures and longer times), acts as an internal and external lubricant, lowers the thermal degradation of PVC during processing while maintaining good mechanical and thermal properties on final PVC parts (flexural modulus, elastomer modulus, shore hardness, tensile elongation, tensile stress at break, lower coefficient of thermal expansion). As such, it has been found that these polyester additives in a highly filled system can do the work of several traditional PVC additives such as high and low molecular weight acrylic polymers and copolymers, monomeric ester lubricants and paraffin waxes.

As used herein, a polymer system is "highly-filled" when the amount of filler relative to the amount of PVC is greater than a reference filler amount determined in a reference polymer system, the reference polymer system and the polymer system being identical in composition except that the reference polymer system does not include the polyester additive and has a lower amount of the filler relative to the amount of the PVC, the reference filler amount being the highest amount typically found suitable for the given polymer system. The reference filler amount for a given polymer system depends on a number of factors well known to the person of skill in the art, and include the desired material properties of a final product to be formed with the polymer system (e.g., tensile properties, tear properties, optical properties etc.), processing conditions, and filler particle size. It has been found that the polyester additives of the present invention can increase the amount of filler beyond the amount that typically would be suitable for a given application.

For example, a polymer system is "highly-filled" if it contains at least 5% by weight, at least 10% by weight, at least 15% by weight, at least 20% by weight, at least 25% by weight, at least 30% by weight, at least 35% by weight, at least 40% by weight, at least 45% by weight, at least 50% by weight, at least 55% by weight, at least 60% by weight, at least 65% by weight, at least 70% by weight, at least 75% by weight, at least 80% by weight, at least 85% by weight, at least 90% by weight, at least 95% by weight, at least 100% by weight, at least 150% by weight, or at least 200% by weight more non-petroleum based filler than would be suitable in the reference polymer system. For example, for a reference polymer system comprising poly(vinyl chloride), for which up to 12% talc (i.e. non-petroleum based filler) by weight PVC (i.e., pph PVC) can typically be suitable, a corresponding polymer system comprising poly(vinyl chloride), a PHA, and at least 5% by weight more than 12 wt % talc would be highly-filled. For example, if there were 18 wt % talc relative to the PVC in the latter polymer system, the PHA would have allowed a weight increase of talc by 50%.

Additionally, the polymer system of the invention can also be considered highly filled when the filler is present in the system from about 25 pph to about 80 pph PVC. In a first aspect, the filler is present from about 25 to about 70 pph PVC. In a second aspect, the filler is present from about 25 to about 60 pph PVC. In a third aspect, the filler is present from about 25 to about 50 pph PVC. In a fourth aspect, the filler is present from about 25 to about 40 pph PVC, such as 25, 26, 27, 28, 29, 30, 31, 32, 33, 34, or 35 pph PVC.

In yet another embodiment, the filler is present in the polymer system from about 25 pph PVC to about 70 pph PVC and the polyester additive is present from about 1 pph PVC to about 10 pph PVC, such as from about 1 pph PVC to about 5 pph PVC. In second aspect of this embodiment, the PVC is rigid.

In yet another embodiment, the filler is present in the polymer system from about 25 pph PVC to about 70 pph PVC and the polyester additive is present from about 5 pph PVC to about 15 pph PVC. In second aspect of this embodiment, the PVC is semi-rigid.

In a further embodiment, the filler is present in the polymer system from about 25 pph PVC to about 70 pph PVC and the polyester additive is present from about 25 pph to about 50 pph PVC. In a second aspect of this embodiment, the PVC is flexible.

The polyester additives include both biologically synthesized PHAs and chemically polymerized polyesters. The PHAs themselves include homopolymers copolymers or blended PHAs as defined above. The PHA for combining with PVC can be a blend, a copolymer, a mixture or combination of one, two or three or more PHA components. The chemically polymerized polyester additives may be aliphatic polyesters or aliphatic/aromatic polyesters. Aliphatic polyesters include polymers having diol and diacid monomers wherein the diacids comprise succinic acid, glutaric acid, adipic acid, sebacic acid, azealic acid, or their derivatives, e.g., alkyl esters, acid chlorides, or their anhydrides and the diols comprise such monomers as ethylene glycol, propylene glycol, 1,3-propanediol, 1,4-butanediol, 1,6-hexanediol, or 1,4-cyclohexanedimethanol. This includes polyesters such as polybutylene succinate (PBS) and polybutylene succinate-adipate (PBSA). Additionally, aliphatic polyesters include those prepared by ring-opening polymerization of cyclic monomers or lactones such as polycaprolactone (PCL). The aliphatic/aromatic polyesters include copolyesters of polyethylene terephthalate (PET), polybutylene adipate terephthalate and polybutylene terephthalate (PBT) with the diacids and diol listed previously.

The degree of crystallinity calculated for the polymer systems of the invention can be determined by various methods, for example, density calculations, x-ray and electron diffraction, differential scanning calorimetry, infrared absorption (FTIR), Raman spectroscopy and the like.

Physical properties and rheological properties of the polymer systems depend on the molecular weight and distribution of the polymer. "Molecular weight" is calculated in a number of different ways. Unless otherwise indicated, "molecular weight" refers to weight average molecular weight.

"Number average molecular weight" ($M_n$) represents the arithmetic mean of the distribution, and is the sum of the products of the molecular weights of each fraction, multiplied by its mole fraction ($\Sigma N_i M_i / \Sigma N_i$).

"Weight average molecular weight" ($M_w$) is the sum of the products of the molecular weight of each fraction, multiplied by its weight fraction ($\Sigma N_i M_i^2 / \Sigma N_i M_i$). $M_w$ is generally greater than or equal to $M_n$.

The weight average molecular weight of the polyester additives used in the compositions of the invention ranges between about 5,000 to about 2.5 million as measured by light scattering and GPC with polystyrene standards. In certain embodiments, the average molecular weight is about 5,000, about 10,000, about 50,000, about 100,000, about 125,000; about 150,000; about 175,000, about 200,000, about 250,000, about 3000,000, about 400,000, about 500,000, about 600,000, about 700,000, about 800,000, about 900,000, about 1,000,000, about 1,200,000, about 1,300,000, about 1,400,000, about 1,500,000, about 1,600,000, about 1,700,000, about 1,800,000, about 1,900,000 about 2,000,000 about 2,100,000 about 2,200,000 about 2,300,000, about 2,400,000 about 2,500,000 g/mole.

Polyvinyl Chloride (PVC)

Polyvinylchloride (PVC) is a versatile, thermoplastic polymer that is currently used in the production of hundreds of consumer products encompassing such diverse commercial markets as construction, electronics, healthcare, and other applications. At the global level, demand for PVC well exceeds 35 million tons per year making it the third largest volume thermoplastic behind polyethylene and polypropylene. The reason polyvinylchloride is so widely used to manufacture products is due to a combination of its low cost, versatility and desirable material properties. Notable material properties include excellent resistance to acids, bases, aliphatic hydrocarbon solvents, oils, and oxidizing agents; good flame retardancy (self-extinguishing); good weatherability especially when suitable additives are incorporated (stabile to ozone and UV exposure); good insulating properties for low frequency electrical systems; good low temperature mechanical properties and PVC products generally have long life with concomitantly low maintenance costs.

The versatility of PVC is due in part to its ability to accept large amounts of additives or fillers which alter its material properties considerably leading to a wide variety of applications. It therefore can be fabricated efficiently by calendaring, extrusion or coating into a very wide range of both rigid, semi-rigid and flexible products. The rigidity of PVC can be quantified by measuring the modulus (flexural or tensile) or by measuring the hardness which is an indication of the resistance of the material to permanent deformation. For example, it is desirable for rigid PVC compounds to exhibit both high stiffness (high flexural modulus) and high notched impact resistance. There are several scales for evaluating hardness such as Rockwell (R, L, M, E and K), Durometer (Shore A and D) and Barcol. The Shore D (ASTM D2240) hardness test consists of an indentor which is pressed into a flat ¼ inch thick sample while the material hardness is read from a gauge (no units) attached to the indentor. The higher the hardness value, the more rigid and stiff a material is. While no one hardness test can characterize all flexible to stiff materials, it can be generally stated that Shore D hardness values of >65 reflect materials that are rigid while values <60 reflect materials that are soft and flexible. Materials with Shore D Hardness values in the range 60-65 are considered as semi-rigid (see ASTM D2240-75).

The additives that are incorporated into PVC the most by far are plasticizers which generally impart "rubber-like" properties to the PVC by lowering the glass transition temperature ($T_g$). Plasticizers also impart low temperature resistance to embrittlement or mechanical fracture. The compatibility or miscibility of a plasticizer with a given polymer is its most important property whereby high "compatibility" means a homogenous mixture of a plasticizer and polymer having optimum material properties. It should be noted that other additives such as heat stabilizers, UV stabilizers, impact modifiers and processing aids are also important for optimizing the performance of PVC formulations.

The most common plasticizers used to date to improve the flexibility of PVC have been phthalates. Other types of plasticizers such as phosphates, adipates, azelates and sebacates are also utilized to improve the flexibility of polyvinylchloride especially at low temperatures. More recently, PVC compounders have been evaluating biobased plasticizers as an alternative to the petroleum-derived plasticizers in order to minimize the impact on the environment both during production of the plasticizer and end-of-life degradation of PVC products. Typical biobased PVC plasticizers include trialkyl trimellitate esters, vegetable-based esters such as hydrogenated castor oil, succinates and levulinic acid esters. The major shortcoming of a number of these plasticizers, both petroleum-derived and biobased are that they are low molecular weight compounds which can be extracted or even lost through volatilization from PVC especially in elevated temperature applications. Loss of the plasticizer over time leads to stiffening, embrittlement and ultimately failure of the PVC part.

Pure polyvinyl chloride without any plasticizer is a white, brittle solid and is made by polymerization of the chloroethene monomer. The polymerization reaction used to prepare polyvinylchloride (PVC) is shown below:

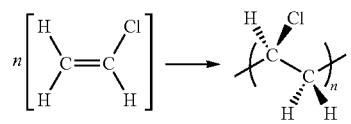

A number of different processes can be used to prepare the polymer including emulsion, suspension and bulk polymerization methods. PVC is available in several different forms including solid, water-based emulsions (latex) or solids suspensions in plasticizers (plastisols). Producers of PVC materials include Dupont (ELVAX™ PVC), Shell (Carina™ PVC), Wacker (VIRMOL™ PVC) and Sumitomo (SUMILIT™ PVC).

Solid PVC resins are often characterized by a K value. This is a number calculated from dilute solution viscosity measurements of a polymer, used to denote degree of polymerization or molecular size. The formula for calculating the PVC K value is given as:

$$\frac{\log(N_S/N_0)}{c} = \frac{75K^2}{1+1.5Kc} + K$$

where:
$N_S$=viscosity of the solution
$N_0$=viscosity of the solvent
c=concentration in grams per ml The higher the K value, the higher the molecular weight of the PVC resin and the melt viscosity. In certain embodiments, the the K-value of the PVC can be from 57 to 70.

Thermal Stability of PVC

Even though polyvinylchloride has been one of the most important polymeric materials over the past few decades, it is well known that the PVC has the disadvantage of having relatively low thermal stability. Thermal stability in general relates to the process whereby through high temperature, high pressure, oxidation or mechanical stress, the long chains of a polymer begins to break and react with one another thereby changing the properties of the polymer. Since thermoplastic materials are usually formed into products by the application of heat, pressure and/or mechanical stress, degradation can pose a serious problem for product performance.

For PVC, it is known that thermal degradation begins to occur at about 190° C. and initially involves the stripping off of hydrogen chloride (dehydrochlorination) with the concomitant formation of conjugated double bonds or polyene sequences leading to discoloration of the polymer. The polyene sequences can further react to form either crosslinks or cyclize to form benzene and toluene volatiles. In the presence of oxygen, oxidation reactions can also occur leading to chain scission and molecular weight reduction. Thermal degradation thus causes both chemical and physical changes, which then lead to some problems due to PVC's reduced performance.

It has been found that the initiation of dehydrochlorination in PVC occurs simultaneously on multiple positions along the polyvinylchloride backbone chain where allyl chloride structures exist. These chlorine atoms which are adjacent to double bonds are more thermally labile than the corresponding hydrogen atoms and are therefore easily lost at high temperatures. Once hydrogen chloride (HCl) is formed by this reaction, the HCl released acts to accelerate the thermal degradation process of the PVC polymer. To prevent thermal degradation from occurring in polyvinylchlorides, additives such as organotin mercaptides/sulfides or metal carboxylates are usually added. The metal carboxylates are mixtures based on salts of aliphatic (oleic) or aromatic (alkylbenzoic) carboxylic acids usually with combinations of barium/zinc or calcium/zinc metals. These additives improve thermal stability by acting directly at the dehydrochlorination initiation site and/or by reacting with the free HCl generated. In the case of the metal carboxylates, reaction with HCl produces chloride salts which can also have a destabilizing effect on the PVC. Therefore co-stabilizers such as polyols, phosphites and epoxy plasticizers are often used along with the metal carboxylates to improve initial color, transparency and long term PVC stability.

For semi-rigid and flexible polyvinylchlorides, plasticizer's are also a major component of the overall product formulation. It has been found that plasticizer type, concentration and oxidative stability (formation of peroxide radicals) all affect the thermal stability of PVC. Studies on the influence of plasticizers on PVC thermal stability have suggested that solvation of the PVC chains by the plasticizer can have a positive thermal stabilizing effect on the PVC polymer (D. Braun, "*Thermal Degradation of Polyvinyl-Chloride*" in Developments in Polymer Degradation, 1981; M. Semsarzadeh et. al., *Iranian Polymer Journal*, vol. 14, No 9, 769 (2005)).

Measurement of the thermal stability of PVC has been carried out by a variety of techniques. These are based on changes in color on heating PVC test sheets (static heat test), temperature at which first weight loss for PVC occurs on heating (dynamic heat test) or the time to detect HCl when PVC is heated. For the dynamic heat test, Thermogravimetric Analysis (TGA) can be carried out on a PVC sample where by the sample is heated under a nitrogen or oxygen atmosphere while the % weight loss versus temperature is recorded. Using TGA, the temperature at which thermal degradation starts is defined either as the point at which catastrophic weight loss starts occurring ($T_{onset}$), or the temperature where the percent weight loss reaches 1% or 5% of the initial sample weight. The more thermally stable the PVC sample, the higher the temperature where degradation is measured to start.

Polyester Additives

Polyester additives suitable for practicing the disclosed invention can be aliphatic or aliphatic/aromatic polyesters. Polyesters suitable as additives or as components of a polyester additive can be produced by a number of different polymerization technologies including: biological synthesis inside living cells as is the case for polyhydroxyalkanoate biopolymers or can be produced by traditional chemical synthetic approaches.

Polyhydroxyalkanoates

Polyhydroxyalkanoates are aliphatic polyesters produced by a broad range of natural and genetically engineered bacteria as well as genetically engineered plant crops (Braunegg et al., (1998), *J. Biotechnology* 65:127-161; Madison and Huisman, 1999, *Microbiology and Molecular Biology Reviews*, 63:21-53; Poirier, 2002, *Progress in Lipid Research* 41:131-155). These polymers are biodegradable thermoplastic materials, produced from renewable resources, with the potential for use in a broad range of industrial applications (Williams & Peoples, CHEMTECH 26:38-44 (1996)).

Over 100 different types of monomers have been incorporated into the PHA polymers (Steinbüchel and Valentin, 1995, *FEMS Microbiol. Lett* 128:219-228.

The PHA biopolymers preferably contain one or more units of the following formula:

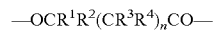

wherein n is 0 or an integer; and wherein $R^1$, $R^2$, $R^3$, and $R^4$ are independently selected from saturated and unsaturated hydrocarbon radicals, and hydrogen atoms.

In some embodiments, the PHA in the methods described herein is a homopolymer (where all monomer units are the same). Examples of PHA homopolymers include poly 3-hydroxyalkanoates (e.g., poly 3-hydroxypropionate (hereinafter referred to as P3HP), poly 3-hydroxybutyrate (hereinafter referred to as P3HB or PHB) and poly 3-hydroxyvalerate), poly 4-hydroxyalkanoates (e.g., poly 4-hydroxybutyrate (hereinafter referred to as P4HB), or poly 4-hydroxyvalerate (hereinafter referred to as P4HV)) and poly 5-hydroxyalkanoates (e.g., poly 5-hydroxyvalerate (hereinafter referred to as P5HV)). In some embodiments the PHAs can be copolymers and in particular co-polymers of 3-hydroxybutyrate (PHB) polymerized with one or more co-monomers. Examples of PHA copolymers suitable for practicing this invention include poly 3-hydroxybutyrate-co-3-hydroxypropionate (hereinafter referred to as PHB3HP), poly 3-hydroxybutyrate-co-lactic acid (hereinafter referred to as PHBLA) poly-3-hydroxybutyrate-co-4-hydroxybutyrate (hereinafter referred to as P3HB4HB), poly-3-hydroxybutyrate-co-4-hydroxyvalerate (hereinafter referred to as PHB4HV), poly-3-hydroxybutyrate-co-3-hydroxyvalerate (hereinafter referred to as PHB3HV), poly-3- hydroxybutyrate-co-3-hydroxyhexanoate (hereinafter referred to as PHB3HH) and poly-3-hydroxybutyrate-co-5-hydroxyvalerate (hereinafter referred to as PHB5HV) and poly-3-hydroxybutyrate-co-6-hydroxyhexanoate (hereinafter referred to as PHB6HH). Poly-3-hydroxybutyrate-co-3-hydroxyoctanoate (hereinafter referred to as PHB3HO). Other PHAs useful for practicing this invention may contain a range of 3-hydroxymoners selected from 3HH, 3HO, 3HD etc. and are typically produced by fermentation of vegetable oils or fatty acids.

In certain embodiments, the starting PHA can be a copolymer (containing two or more different monomer units) in which the different monomers are randomly distributed in the polymer chain. By selecting the monomer types and controlling the ratios of the monomer units in a given PHA copolymer a wide range of material properties can be achieved. Although examples of PHA copolymers having two different monomer units have been provided, the PHA can have more than two different monomer units (e.g., three different monomer units, four different monomer units, five different monomer units, six different monomer units) An example of a PHA having 4 different monomer units would be PHB-co-3HH-co-3HO-co-3HD or PHB-co-3-HO-co-3HD-co-3HDd (these types of PHA copolymers are hereinafter referred to as PHB3HX). Typically where the PHB3HX has 3 or more monomer units the 3HB monomer is at least 70% by weight of the total monomers, preferably 85% by weight of the total monomers, most preferably greater than 90% by weight of the total monomers for example 92%, 93%, 94%, 95%, 96% by weight of the copolymer and the HX comprises one or more monomers selected from 3HH, 3HO, 3HD, 3HDd.

PHB copolymers suitable for us in the present invention, typically have a co-monomer content in the range of 3 weight % to 30 weight % of the total monomers in the copolymers.

In a particular embodiment, the PHA can be a homopolymer of a polyhydroxyalkanoate, a copolymer of a polyhydroxyalkanoate, and a blend of polyhydroxyalkanoates (e.g., a blend of at least one homopolymer and at least one copolymer, two or more homopolymers, or two or more copolymers). In a first aspect, the PHA is a copolymer. In a second aspect, the PHA comprises a copolymer of poly-3-hydroxybutyrate and one or more monomers selected from glycolic acid, lactic acid, 3-hydroxypropionic acid (3HP), 4-hydroxybutyrate (4HB), 3-hydroxyvalerate, 4-hydroxyvalerate (4HV), 5-hydroxyvalerate (5HV), 3-hydroxyhexanoate (3HH), 6-hydroxyhexanoate (6HH), 3-hydroxyoctanoate (3HO), and 3-hydroxydecanoate (3HD), wherein the monomer content is about 10 to about 75% of the weight of the PHA. In a third aspect, the PHA copolymer is selected from 3-polyhydroxybutyrate-co-4-polyhydroxybutyrate, 3-polyhydroxybutyrate-co-3-polyhydroyvalerate, 3-polyhydroxybutyrate-co-5-polyhydroyvalerate and 3-polyhydroxybutyrate-co-6-polyhydroxyhexanote. In a fourth aspect, the PHA copolymer is 3-polyhydroxybutyrate-co-4-polyhydroxybutyrate, having a weight % of 4HB from about 10% to about 15% of the weight of the PHA. In a fifth aspect, the PHA copolymer is 3-polyhydroxybutyrate-co-4-polyhydroxybutyrate, having a weight % of 4HB from about 10% to about 15% of the weight of the PHA. In a sixth aspect, the PHA copolymer is 3-polyhydroxybutyrate-co-4-polyhydroxybutyrate, having a weight % 4HB of from about 40% to about 50% of the weight of the PHA.

In another particular embodiment, the PHA comprises a blend of PHA copolymers. In a first aspect, the copolymer blend comprises at least one poly-3-hydroxybutyrate-co-4-polyhydroxybutyrate copolymer. In a second aspect, the copolymer blend comprises a 3-polyhydroxybutyrate-co-4-polyhydroxybutyrate copolymer having a weight % of 4HB from about 10% to about 15% of the weight of the PHA and a 3-polyhydroxybutyrate-co-4-polyhydroxybutyrate copolymer having a weight % of 4HB from about 15% to about 65% of the weight of the PHA, such as from about 15% to about 30% or from about 30% to about 65%.

The PHA blend can also be a blend as disclosed in U.S. Published Application No. US 2004/0220355, International Publication No. WO 2010/008445, which was published in English on Jan. 21, 2010, and designated the United States, and is titled "Branched PHA Compositions, Methods For Their Production, And Use In Applications," which was filed in English and designated the United States. This application is incorporated by reference herein in their entirety.

Microbial systems for producing the PHB copolymer PHBV are disclosed in, e.g., U.S. Pat. No. 4,477,654 to Holmes, which is incorporated herein by reference in its entirety. U.S. Published Application No. US 2002/0164729 (also incorporated herein by reference in its entirety) by Skraly and Sholl describes useful systems for producing the PHB copolymer PHB4HB. Useful processes for producing the PHB copolymer PHB3HH have been described (Lee et al., 2000, *Biotechnology and Bioengineering* 67:240-244; Park et al., 2001, *Biomacromolecules* 2:248-254 and in US Patent Publication Number US2011/0091948A1 to Kaneka Corporation). Processes for producing the PHB copolymers PHB3HX have been described by Matsusaki et al. (*Biomacromolecules* 2000, 1:17-22). Systems for producing PHA copolymers comprising 2-hydroxyacids have also been described (Matsumoto, K and Taguchi, S. (2013) Applied and Microbiol. Biotechnol. 0/0, 1-13.) PHBV, PHB4HB and PHBH copolymers are commercially available.

In determining the molecular weight techniques such as gel permeation chromatography (GPC) can be used. In the methodology, a polystyrene standard is utilized. The PHA can have a polystyrene equivalent weight average molecular weight (in daltons) of at least 500, at least 10,000, or at least 50,000 and/or less than 2,000,000, less than 1,000,000, less than 1,500,000, and less than 800,000. In certain embodiments, preferably, the PHAs generally have a weight-average molecular weight in the range of 100,000 to 700,000. For example, the molecular weight range for PHB and Type 1 PHB copolymers for use in this application are in the range of 400,000 daltons to 1.5 million daltons as determined by GPC method and the molecular weight range for Type 2 PHB copolymers for use in the application 100,000 to 1.5 million daltons.

Aliphatic Polyester Additives

Included in this group of polyester additives are polymers based on the condensation product of diacids and diols monomers which may be biobased or petroleum-based. The diacids include monomers such as succinic acid, glutaric acid, adipic acid, sebacic acid, azealic acid, or their derivatives, e.g., alkyl esters, acid chlorides, or their anhydrides. The diols comprise such monomers as ethylene glycol, propylene glycol, 1,3-propanediol, 1,4-butanediol, 1,6-hexanediol, or 1,4-cyclohexanedimethanol.

Examples of non-PHA biodegradable aliphatic polymers based on diacids/diol monomers includes polybutylene succinate (PBS) and polybutylene succinate adipate (PBSA). PBS and PBSA are synthetic, petroleum-based aliphatic polyesters, typically made by condensation polymerization of one or more diacids and one diol followed by chain extension using multi-functional isocyanates. PBS is a combination of 1,4-butanediol and succinic acid, while PBSA is a combination of 1,4-butanediol, succinic acid, and adipic acid. Although typically synthesized from petroleum, it is also possible for the monomers that make up PBS or PBSA to be produced from biobased feedstock. Commercial producers of PBS and PBSA include Showa High Polymer (BIONOLLE®), SkyGreen BDP, SK Polymer, Ire Chemicals and Samsung Chemicals.

The two polymers are reportedly biodegradable at ambient temperatures (i.e., are "cold compostable") in soil and marine conditions. PBS however degrades more slowly compared to PBSA. Further, PBS and PBSA are known to biodegrade more slowly than PHAs, which are also cold-compostable.

Of the two diacids/diol polymers, PBS has the higher crystallinity, and is better suited for molding applications, while PBSA is softer and has a lower crystallinity which is better suited to film applications. Both polymers have a low (sub-zero) glass transition temperature (PBS $T_g$~-10° C.; PBSA $T_g$~-45° C.), and their processing temperatures overlap with PHAs and PVC recyclates (PBS $T_m$~120° C.; PBSA $T_m$~114° C.). Because of their low $T_g$ values, PBS and PBSA have been used as blend modifiers for other biodegradable polymers such as PLA (U.S. Pat. No. 5,883,199) and PHA's (U.S. Pat. No. 8,524,856).

Another type of aliphatic polyester is produced by catalyzed ring-opening polymerization (ROP) of lactones. One such polymer is poly(e-caprolactone) which is generally obtained by ROP of e-caprolactone in the presence of aluminium isopropoxide. PCL is widely used as a PVC solid plasticizer or for polyurethane applications. But, it finds also some application based on its biodegradable character in domains such as controlled release of drugs, soft compostable packaging to name a few. Different commercial grades are produced by Solvay (CAPA®) or by Union Carbide (Tone®). PCL has a very low Tg (-61° C.) and a low melting point (65° C.), which could be a handicap in some applications. Therefore, PCL is generally blended or modified (e.g., copolymerisation, crosslink).

Aliphatic/Aromatic Polyester Additives

Aromatic polyesters, can be synthesized by the polycondensation of aliphatic diols and aromatic dicarboxylic acids. The aromatic ring is resistant to hydrolysis, preventing biodegradability. Polyethylene terephthalate (PET) and polybutylene terephthalate (PBT) are formed by the polycondensation of aliphatic glycols and terephthalic acid. The biodegradability of aromatic polyesters can be modified by the addition of monomers that are not resistant to hydrolysis, aliphatic diol or diacid groups. The addition of such hydrolysis-sensitive monomers creates chemically vulnerable sites for hydrolysis to occur along the polymer backbone chain.

Aromatic-aliphatic polyesters can also be made by polycondensation of aliphatic diols, but with a mixture of aromatic and aliphatic dicarboxylic acids. For instance, modification of PBT by addition of aliphatic dicarboxylic acids can produce polybutylene succinate terephthalate (PBST) (butanediol as the aliphatic diol and succinic and terephthalic acid). Another example is the family of polyesters sold under the trade name BIOMAX® (DuPont), the members of which are polymerized from PET and a variety of aliphatic acid monomers such as dimethylglutarate and diethylene glycol. In the synthesis of polybutylene adipate terephthalate (PBAT), butanediol is the diol, and the acids are adipic and terephthalic acids. Commercial examples include ECOFLEX® (BASF), ENPOL® (Samsung Fine Chemicals.) and EASTAR BIO® (Eastman). ECOFLEX® has a melt temperature ($T_m$) of about 110° C. to about 120° C., as measured by differential scanning calorimetry (DSC). Another example is polytetramethylene adipate terephthalate (PTMAT) which is synthesized from tetramethylene glycol and adipic and terephthalic acids. The biodegradable aromatic-aliphatic polyester can be a co-polyester. It can also itself be a blend of such polyesters or co-polyesters Other Additives In certain embodiments, various additives are added to the compositions. Examples of these additives include, but are not limited to, antioxidants, compatibilizers, thermal and UV stabilizers, inorganic (talc, calcium carbonate) and organic fillers, plasticizers, fusion promoters (oxidized polyethylene), internal and external lubricants, processing aids, antistats, flame retardants, fusion or gelling assistants (methyl methacrylate polymers and copolymers), torque reducing agents, scavenging compounds, reinforcing agents, impact modifiers (polyacrylates, chlorinated PE), blowing agents, pigments, nucleating agents which are not typically needed in the compositions of the invention, anti-slip agents, anti-blocking agents and radical scavengers.

Thermal Stabilizers

The thermal degradation of PVC polymer systems is governed by the following degradation reactions: dehydrochlorination, autooxidation, mechanical/chemical chain scission and crosslinking. In commercial applications, these degradation mechanisms are controlled by the addition of heat stabilizers which are commonly composed of organic salts containing Na, K, Ca, Ba or Zn metals. In the presence of polyhydroxyalkanoates, such as poly-3-hydroxybutyrate, poly-4-hydroxybutyrate or their copolymers, these heat stabilizers could accelerate the thermal degradation of the PHA polymers themselves and therefore care must typically be taken to choose the appropriate stabilizers which will simultaneously minimize PVC recyclate degradation but not accelerate the thermal degradation of the PHA.

PVC heat stabilizers which prevent the dehydrochlorination reaction include the salts of strongly or moderately basic metal cations such as Na, K, Ca, Ba, Sr, Mg, Pb. They are additionally combined with primary metal salts, such as Zn, that participate in the chlorine displacement reactions. Suitable combinations of mixed metal stabilizers include Ba/Zn or Ca/Ba/Zn which have been shown to provide good overall stabilization, initial color and long term thermal stability of PVC. The Ba/Zn cation ratios in the salt mixtures could be in the range of about 1:1 to about 10:1 and preferably of about 3:1 to about 8:1, more preferably of about 3.5:1 and 4:1 or 5:1 to 6:1. Commercial heat stabilizers useful in the described invention include MARK® 4781a (Galata Chemicals) heat stabilizer and PLASTISTAB™ 2442 (AM Stabilizers) heat stabilizer and the like.

The salt mixtures also contain an anionic group comprising two different types of carboxylic acid groups. One of the types consists of one or more anions selected from the group of linear or branched, saturated or unsaturated aliphatic carboxylic acids. The most preferred carboxylic acids are oleic acid, neodecanoic acid and isomers of octanoic acid, such as 2-ethyl hexanoate. The second type of anion consists of one or more aromatic carboxylic acids. The aromatic carboxylic acids are molecules containing a phenyl ring to which the carboxylic moiety is directly or indirectly bonded through a saturated or unsaturated alkylene bridge; the phenyl ring can be additionally substituted with one or more alkyl groups. The preferred aromatic carboxylic acids are substituted derivatives of benzoic acid; the most preferred aromatic carboxylic acids, and in particular isopropyl benzoic acid, 4-ethyl benzoic acid, 2-methyl benzoic acid, 3-methylbenzoic acid, 4-methylbenzoic acid, 3,4-dimethyl benzoic acid and 2,4, 6-trimethyl benzoic acid. The presence of aromatic carboxylic acids is very important because their salts improve the initial color of the PVC formulations during processing without affecting transparency. Optionally, one or more co-stabilizers, such as β-diketones and dihydropyridines, solutions of barium carboxylate/barium carbonate (overbased barium see U.S. Pat. No. 5,656,202), zinc salts of aliphatic carboxylic acids (to have more flexibility in the ratio Ba/Zn), organic derivatives of phosphorous and, high boiling point hydrocarbons and plasticizers used as diluents can be added to the thermal stabilizers.

Liquid thermal PVC stabilizers are generally comprised of a) a mixture of barium and zinc salts of one or more linear or branched aliphatic saturated or unsaturated carboxylic acids containing from 6 to 20 carbon atoms and of one or more aromatic carboxylic acid containing from 8 to 10 carbon atoms, wherein the weight ratio of aliphatic acids salts to aromatic acids salts is higher than 3:1 and b) one or more organic phosphites of the formula $R^1OP(OR^2)OR^3$ wherein $R^1$, $R^2$ and $R^3$ are the same or different and each is an alkyl group containing from 6 to 15 carbon atoms or phenyl group or C10-C20 alkyl aryl. These types of stabilizers are described in U.S. Pat. No. 2,294,122, European Patent No. 0792317, U.S. Pat. No. 5,880,0189 and International Patent App. No. WO2010000734A1. It has been found that the liquid type stabilizers show the best thermal stability performance in PVC/Polyester additive blends especially when combined with secondary heat stabilizers such as plasticizers, antioxidants and lubricants which help to prevent thermo-oxidative degradation. Another type of mixed metal stabilizer composition is described in European Patent App. No. 0849314 A1 which consists of (A) about 10 to about 40 parts by weight of a zinc carboxylate; (B) about 50 to about 80 parts by weight of an alkyl ester of thiodipropionic acid; and (C) about 5 to about 20 parts by weight of a phenolic antioxidant.

Other important PVC heat stabilizers that may be used in PVC/PHA blends include mild alkalis such as sodium carbonate; various metal-free organic compounds such as the polyols, e.g. mannitol, sorbitol, glycerol and pentaerythritol; 1,2-epoxides, e.g. soy bean oil epoxide, isooetyl epoxystearate and the diglycidyl ether of 2,2-bis(p-hydroxyphenyl) propane; nitrogen compounds such as phenylurea, N,N'-diphenylthiourea, and 2-phenylindole; organotin mercaptides (U.S. Pat. No. 2,641,588); mercaptoesters and thioglucolates which reportedly impart multifunctional stabilization (European Pat. No. 0813572); diketones complexed with metal salts of organic acids such as calcium benzoate, 1,3-diphenylpropane-1,3-dionate (European Pat. No. 1517878); alkyl tin compounds as described in European Pat. App. No. 1877413.

Co-stabilizers such as organic phosphites are also known to impart thermal stability to chlorine-containing polymers and may also be suitable for PVC/PHA blends. These include triesters of phosphoric acid such as trioctyl, trideeyl, tridodecyl, tritridecyl, tripentadecyl, trioleyl, tristearyl, triphenyl, tricresyl, tris(nonylphenyl), tris(2,4-tert-butylphenyl) and tricyclohexyl phosphite (International Pat. No WO2005019323); phosphite compositions comprising at least two of a tris(dibutylaryl) phosphite, a tris(monobutylaryl) phosphite, a bis(dibutylaryl)monobutylaryl phosphite, and a bis(monobutylaryl)dibutylaryl phosphite (U.S. Pat. No. 8,008,384); phosphite mixtures with amines to make them hydrolytically stable (European Patent App. No. 2459575).

Plasticizers, Antioxidants, Surfactants, Lubricants

In the polymer systems of the present invention, plasticizers can be used to change the glass transition temperature and modulus of the composition, but surfactants may also be used. Lubricants may also be used, e.g., in injection molding applications. Plasticizers, surfactants and lubricants may therefore be included in the overall PVC formulation.

A plasticizer is a substance which is added to PVC in order to improve its processability, flexibility and stretchability. It can also decrease melt viscosity during processing and lower the glass transition temperature ($T_g$) as well as the elastic modulus without altering the fundamental chemical character of PVC. There is no stoichiometric upper limit to the amount of plasticizer that can be taken up by PVC. Therefore this allows a processor to form products with a wide variety of flexibility and to tailor the PVC product to the application. The main factors that influence the plasticizer choice include the cost, PVC compatibility and permanence (migration, volatility and extractability resistance) in the PVC formulation.

Plasticizer types are classified according to their particular function: primary (good compatibility with PVC; must gel PVC under the usual processing temperatures quickly), secondary (lower gelling power and limited compatibility with PVC), extender (gel PVC poorly; used as diluent for primary plasticizer), general purpose, high temperature, low temperature, fast fusing, non-migratory or low viscosity. Usually plasticizers are used in combination to In broad terms, the compatibility of the common PVC additives capable of plasticization, lubrication, stabilization and their usual level of addition in PVC compositions, decrease as shown in the following sequence:

Primary plasticizers>secondary plasticizers and extenders>impact modifiers and processing aids>stabilizers and lubricants The plasticizers can be either petroleum based and/or biobased. Examples of plasticizers include phthalic compounds (including, but not limited to, dimethyl phthalate, diethyl phthalate, dibutyl phthalate, dihexyl phthalate, di-n-octyl phthalate, di-2-ethylhexyl phthalate, diisooctyl phthalate, dicapryl phthalate, dinonyl phthalate, diisononyl phthalate, didecyl phthalate, diundecyl phthalate, dilauryl phthalate, ditridecyl phthalate, dibenzyl phthalate, dicyclohexyl phthalate, butyl benzyl phthalate, octyl decyl phthalate, butyl octyl phthalate, octyl benzyl phthalate, n-hexyl n-decyl phthalate, n-octyl phthalate, and n-decyl phthalate), phosphoric compounds (including, but not limited to, tricresyl phosphate, trioctyl phosphate, triphenyl phosphate, octyl diphenyl phosphate, cresyl diphenyl phosphate, and trichloroethyl phosphate), adipic compounds (including, but not limited to, dibutoxyethoxyethyl adipate (DBEEA), dioctyl adipate, diisooctyl adipate, di-n-octyl adipate, didecyl adipate, diisodecyl adipate, n-octyl n-decyl adipate, n-heptyl adipate, diisononyl and n-nonyl adipate), sebacic compounds (including, but not limited to, dibutyl sebacate, dioctyl sebacate, diisooctyl sebacate, and butyl benzyl sebacate), azelaic compounds, citric compounds (including, but not limited to, triethyl citrate, acetyl triethyl citrate, tributyl citrate, acetyl tributyl citrate, and acetyl trioctyl citrate), glycolic compounds (including, but not limited to, methyl phthalyl ethyl glycolate, ethyl phthalyl ethyl glycolate, and butyl phthalyl ethyl glycolate), trimellitic compounds (including, but not limited to, trioctyl trimellitate and tri-n-octyl n-decyl trimellitate), phthalic isomer compounds (including, but not limited to, dioctyl isophthalate and dioctyl terephthalate), ricinoleic compounds (including, but not limited to, methyl acetyl, recinoleate and butyl acetyl recinoleate), polyester compounds (including, but not limited to reaction products of diols selected from butane diol, ethylene glycol, propane 1,2 diol, propane 1,3 diol, polyethylene glycol, glycerol, diacids selected from adipic acid, succinic acid, succinic anhydride and hydroxyacids such as hydroxystearic acid, epoxidized soy bean oil, chlorinated paraffins, chlorinated fatty acid esters, fatty acid compounds, plant oils, pigments, and acrylic compounds. The plasticizers may be used either alone respectively or in combinations with each other.

In certain embodiments, the compositions and methods of the invention include one or more antioxidants. The antioxidants function as secondary heat stabilizers for the PVC/polyester additive blends and include compounds such as alkylated monophenols, e.g., 2,6-di-tert-butyl-4-methylphenol; alkylthiomethylphenols, e.g., 2,4-dioctylthiomethyl-6-tert-butylphenol; alkylated hydroquinone's, e.g., 2,6-di-tert-butyl-4-methoxyphenol; hydroxylated thiodiphenyl ethers, e.g., 2,2'-thiobis(6-tert-butyl-4-methylphenol); alkylidenebisphenols, e.g., 2,2'-methylenebis(6-tert-butyl-4-methylphenol); benzyl compounds, e.g., 3,5,3',5'-tetra-tert-butyl-4,4'-dihydroxydibenzyl ether; hydroxybenzylated malonates, e.g., dioctadecyl 2,2-bis(3,5-di-tert-butyl-2-hydroxybenzyl) malonate; hydroxybenzyl aromatics, e.g., 1,3,5-tris(3,5-di-tert-butyl-4-hydroxybenzyl)-2,4,6-trimethylbenzene; triazine compounds, e.g., 2,4-bisoctylmercapto-6-(3,5-di-tert-butyl-4-hydroxyanilino)-1,3,5-triazine; phosphonates and phosphonites, e.g., dimethyl 2,5-di-tert-butyl-4-hydroxybenzylphosphonate; acylaminophenols, e.g., 4-hydroxylauranilide; esters of β-(3,5-di-tert-butyl-4-hydroxyphenyl)propionic acid, β-(5-tert-butyl-4-hydroxy-3-methylphenyl)propionic acid, P-(3,5-dicyclohexyl-4-hydroxyphenyl)propionic acid; esters of 3,5-di-tert-butyl-4-hydroxyphenylacetic acid with mono- or polyhydric alcohols; amides of β-(3,5-di-tert-butyl-4-hydroxyphenyl) propionic acid e.g. N,N-bis(3,5-di-tert-butyl-4-hydroxyphenyl-propionyl)hexamethylenediamine, vitamin E (tocopherol) and derivatives of the foregoing. Mixtures of the antioxidants may also be used.

In certain embodiments, the compositions and methods of the invention include one or more surfactants. Surfactants are generally used to de-dust, lubricate, reduce surface tension, and/or densify. Examples of surfactants include, but are not limited to mineral oil, castor oil, and soybean oil. One mineral oil surfactant is Drakeol 34, available from Penreco (Dickinson, Tex., USA). Maxsperse W-6000 and W-3000 solid surfactants are available from Chemax Polymer Additives (Piedmont, S.C., USA). Non-ionic surfactants with HLB values ranging from about 2 to about 16 can be used, examples being TWEEN®-20, TWEEN®-65, SPAN®-40 and SPAN®-85.

Anionic surfactants include: aliphatic carboxylic acids such as lauric acid, myristic acid, palmitic acid, stearic acid, and oleic acid; fatty acid soaps such as sodium salts or potassium salts of the above aliphatic carboxylic acids; N-acyl-N-methylglycine salts, N-acyl-N-methyl-beta-alanine salts, N-acylglutamic acid salts, polyoxyethylene alkyl ether carboxylic acid salts, acylated peptides, alkylbenzenesulfonic acid salts, alkylnaphthalenesulfonic acid salts, naphthalenesulfonic acid salt-formalin polycondensation products, melaminesulfonic acid salt-formalin polycondensation products, dialkylsulfosuccinic acid ester salts, alkyl sulfosuccinate disalts, polyoxyethylene alkylsulfosuccinic acid disalts, alkylsulfoacetic acid salts, (alpha-olefinsulfonic acid salts, N-acylmethyltaurine salts, sodium dimethyl 5-sulfoisophthalate, sulfated oil, higher alcohol sulfuric acid ester salts, polyoxyethylene alkyl ether sulfuric acid salts, secondary higher alcohol ethoxysulfates, polyoxyethylene alkyl phenyl ether sulfuric acid salts, monoglysulfate, sulfuric acid ester salts of fatty acid alkylolamides, polyoxyethylene alkyl ether phosphoric acid salts, polyoxyethylene alkyl phenyl ether phosphoric acid salts, alkyl phosphoric acid salts, sodium alkylamine oxide bistridecylsulfosuccinates, sodium dioctylsulfosuccinate, sodium dihexylsulfosuccinate, sodium dicyclohexylsulfosuccinate, sodium diamylsulfosuccinate, sodium diisobutylsulfosuccinate, alkylamine guanidine polyoxyethanol, disodium sulfosuccinate ethoxylated alcohol half esters, disodium sulfosuccinate ethoxylated nonylphenol half esters, disodium isodecylsulfosuccinate, disodium N-octadecylsulfosuccinamide, tetrasodium N-(1,2-dicarboxyethyl)-N-octadecylsulfosuccinamide, disodium mono- or didodecyldiphenyl oxide disulfonates, sodium diisopropylnaphthalenesulfonate, and neutralized condensed products from sodium naphthalenesulfonate.

In the PVC processing industry, the use of lubricants is essential especially for rigid PVC applications. Lubricants influence the manner in which PVC melts and flows during processing. Several parameters like energy consumption (torque) of the processing equipment, melt or die pressure in the machine, productivity, dispersion of fillers and pigments, fusion or gelation of the PVC, part gloss etc. are directly affected by the selection, combination and concentration of the lubricants in a PVC formulation. Lubricants which are added to rigid, semi-rigid or flexible PVC formulations classically function in two ways: either externally or internally. External lubricants reduce friction between the polymer melt and hot metal surfaces during processing. Typically these have low compatibility with PVC and therefore migrate to the metal surfaces to create a metal release layer (slip effect). The effects on processing include increased fusion time (eg. time to reach peak torque), reduced peak torque (because of decrease in external friction) and a drop in back pressure. Examples of low compatibility/external lubes include paraffin and polyethylene waxes, paraffin oils, epoxidized soybean oil and other vegetable oils, in combination with stearates and $C_{16}$-$C_{18}$ fatty acids.

Typical Internal lubricants reduce friction forces within the polymer matrix and in doing so lower the effective melt viscosity. These are more compatible, have higher polarity and are therefore more soluble with PVC. During processing, the torque is significantly reduced (in consequence of drop in melt viscosity) with little or no effect on fusion time. Examples of high compatibility and internal lubes are partial esters of glycerol, Montan esters and metal soaps such as calcium stearate.

In discharging their primary function, lubricants also affect the thermal stability of a PVC composition by lowering the frictional heat buildup and melt viscosity and hence the effective processing temperature as well as limiting direct contact between the stock ad hot metal surfaces while simultaneously preventing the formation of stagnant deposits. Lubricants reduce the scope for immediate thermal degradation of the PVC in processing and limit its heat history. The first of these two effects is equivalent to improving the short-term thermal stability and the second a factor enhancing the long term stability of the composition. The addition of external lubricants are added to PVC at much lower levels such as 0.05-0.3 pph. For internal lubricants additions levels are generally higher at 0.3-1 pph.

A well balanced lubricant systems result in desirable extruder loads, high output rates, good dimensional control and good finished product physical properties. An imbalanced lubricant system can result in low output rates, high or low extruder loads and barrel temperatures, rough surfaces, low impact strength and midwall tears or voids and poor dimensional control.

If desired, an optional nucleating agent is added to the compositions of the invention to aid in its crystallization if needed. Nucleating agents for various polymers are simple substances, metal compounds including composite oxides, for example, carbon black, calcium carbonate, synthesized silicic acid and salts, silica, zinc white, clay, kaolin, basic magnesium carbonate, mica, talc, quartz powder, diatomite, dolomite powder, titanium oxide, zinc oxide, antimony oxide, barium sulfate, calcium sulfate, alumina, calcium silicate, metal salts of organophosphates, and boron nitride, cyanuric acid and the like.

Fusion Promoters

Fusion promoters are high molecular weight compounds that when added in small quantities improve PVC's processing characteristics by accelerating the fusion or gelation of the PVC as well as improve the rheological and mechanical properties of final PVC products. Similar to the effect with lubricant-type processing aids, fusion promoters are typically formulated with PVC to improve its flowability eg. to decrease the fusion time and decrease the overall processing time required. They are normally high molecular weight polymer compounds that are strongly compatible with PVC which when added tend to enhance wall adhesion of the PVC during mechanical processing. The mechanism of wall-adhering PVC involves an increase in the coefficient of friction between the PVC grains themselves as well as between the PVC grains and hot metal surfaces of the processing machinery. The increased friction causes the formation of shear flow patterns which results in longer residence times of the PVC melt near the walls which generates higher thermal shear stresses improving the melting behavior of the PVC. The typical fusion promoters are composed of acrylic polymers or copolymers such as methyl methacrylate, methyl methacrylate-co-ethyl acrylate, methyl methacrylate-co-butyl acrylate. Commercial suppliers of fusion promoters include Dow (PARALOID®) and Arkema (PLASTISTRENGTH®).

Fillers

In the cable industry, the aim is to obtain the necessary PVC product characteristics and mechanical properties as inexpensively as possible. Therefore, in contrast to most other thermoplastics, fillers in PVC are generally employed for reducing the cost of final products (extenders). The most important application for fillers are in the plasticized PVC formulations. Fillers are usually composed of inert inorganic components (minerals, glass or ceramics) that are referred to as "nonreinforcing" if their role is simply to lower cost and increase the stiffness of the PVC. Fillers are termed "reinforcing" in cases where they have a favorable effect on PVC mechanical strength. The degree of adhesion between the filler and a polymer matrix and filler shape often determines the difference between nonreinforcing and reinforcing fillers. Fillers generally possess chemical and temperature resistance such that they are unaffected by processing with rigid, semi-rigid or flexible PVC polymers. When fillers are added to PVC, the objective during processing is to homogeneously disperse the filler into the polymer matrix to form a discrete inorganic phase. Typical fillers used to manufacture PVC products includes natural calcium carbonates, kaolin, silicates, aluminum hydroxide, dolomite, barium ferrite and talc for plasticized PVC; natural and precipitated calcium carbonate, glass fibers, wood flour and talc for rigid PVC. Other fillers which can be formulated with PVC include carbon black, carbonfibers, aluminum trihydrate, wollastonite, glass fibers, nanclay, starch (crystalline and amorphous), calcium sulfate, glass spheres, mica, silica, feldspar, nephelline, graphite, boron nitride, silicon carbide, silicon nitride, aluminum oxide, titanium dioxide, zinc oxide, iron oxide, magnesium oxide or zirconium oxide.

PVC Rheological Properties

The torque rheometer is widely used for characterizing the melt properties of PVC compositions. It consists of a thermostatically heated mixing chamber housing two rotors mounted in a measuring head and driven by a variable speed motor. The instrument is equipped for continuous measurement of the torque on the rotors (which is a function of the resistance of the PVC composition to the mixing action). The test procedure involves compaction of the test material to a fixed volume, followed by mixing and heating. The amount of work going into the material is indicated by the torque necessary to turn the mixing blades. The amount of heat transferred to the material is mainly a function of material and rheometer bowl temperatures.

During a torque vs. time measurement, initially the PVC is fully compacted causing high initial torque values which rapidly decrease as resin grains are compacted into smaller particles. This compaction torque level continues as frictional heat is generate and heat is transferred from the bowl until the temperature of the material reaches a point where the agglomerates of primary particles begin to stick together initiating an increase in torque. This process of particles sticking together is referred to as fusion or gelation and the time to reach the maximum torque value is called the fusion time. After fusion occurs, the temperature of the mixture continues to increase while the torque decreases and the material is then in the melt stage. Obtaining an adequate amount of fusion in the end product is very important to insure good hydrostatic and impact performance.

During extrusion processing of PVC, it also undergoes a multistage fusion process whereby the PVC heated and compressed eliminating first the free space between the PVC grains then the primary particle agglomerates and finally the primary particles themselves. Interparticle fusion initiates as the melt temperature increases. Finally as the amount of shear stress increases, the primary particles undergo an elongation in the direction of the applied shear. Variations from this mechanism occur with different extruders which impart different amounts of shear into the compound during the early stages of fusion. The objective of extrusion is to deliver a melt, at a suitable temperature and degrees of fusion to the die.

Application of the Compositions

PVC and the polymer systems/compositions described herein may be used for many applications, including but not limited to construction materials (e.g., pipes, tubing, coatings) and also medical applications (e.g. tubing or bags for liquid storage).

For the fabrication of useful articles, the compositions described herein are processed preferably at a temperature above the crystalline melting point of the polymers but below the decomposition point of any of the ingredients (e.g., the additives described above, with the exception of some branching agents) of the polymeric composition. While in heat plasticized condition, the polymeric composition is processed into a desired shape, and subsequently cooled to set the shape and induce crystallization. Such shapes can include, but are not limited to, a fiber, filament, film, sheet, rod, tube, bottle, or other shape. Such processing is performed using any art-known technique, such as, but not limited to, extrusion, injection molding, compression molding, blowing or blow molding (e.g., blown film, blowing of foam), calendaring, rotational molding, casting (e.g., cast sheet, cast film), or thermoforming. Thermoforming is a process that uses films or sheets of thermoplastic. The polymeric composition is processed into a film or sheet. The sheet of polymer is then placed in an oven and heated. When soft enough to be formed it is transferred to a mold and formed into a shape.

During thermoforming, when the softening point of a semi-crystalline polymer is reached, the polymer sheet begins to sag. The window between softening and droop is usually narrow. It can therefore be difficult to move the softened polymer sheet to the mold quickly enough. Measuring the sag of a sample piece of polymer when it is heated is therefore a way to measure the relative size of this processing window for thermoforming.

Films, Sheets and Tapes

The compositions of the inventions can be used for producing films, sheets, blister pack, shrink wrap, roof membranes, geological membranes and tape with certain properties and/or characteristics.

The films or sheets can be single layer or multilayer. Suitable thicknesses include, 0.005 mm to about 0.01 mm, 0.01 mm, 0.02 mm, 0.03 mm, 0.04 mm, 0.05 mm, 0.06 mm, 0.07 mm, 0.08 mm, 0.09 mm or 0.1 mm. The film or sheet can be optically clear or opaque. The films and sheets can be further processed to tapes. The tapes can optionally include an adhesive layer on one or both sides. Also included are laminates.

Other Applications

The compositions described herein can be processed into films of varying thickness, for example, films of uniform thickness ranging from 1-200 microns, for example, 10-75 microns, 75 to 150 microns, or from 50-100 microns. Film layers can additionally be stacked to form multilayer films of the same or varying thicknesses or compositions of the same or varying compositions.

Blow molding, which is similar to thermoforming and is used to produce deep draw products such as bottles and similar products with deep interiors, also benefits from the increased elasticity and melt strength and reduced sag of the polymer compositions described herein.

The compositions described herein are provided in any suitable form convenient for an intended application. For example, the composition is provided in pellet for subsequent production of films, coatings, moldings or other articles, or the films, coatings, moldings and other articles.

The polymeric compositions of the present invention can be used to create, without limitation, a wide variety of useful products, e.g., automotive, consumer durable, consumer disposable, construction, electrical, medical, and packaging products. For instance, the polymeric compositions can be used to make, without limitation, films (e.g., packaging films, hay bale wrap, slit film, food wrap, pallet wrap, protective automobile and appliance wrap, etc.), bags (e.g., trash bags, grocery bags, food bags, compost bags, etc.), hygiene articles (e.g., diapers, feminine hygiene products, incontinence products, disposable wipes, etc.), coatings for pelleted products (e.g., pelleted fertilizer, herbicides, pesticides, seeds, etc.), packaging (including, but not limited to, packaging and containers for beverage products, cosmetic products, detergents and cleaning products, personal care products, pharmaceutical and wellness products), golf tees, caps and closures, agricultural supports and stakes, paper and board coatings (e.g., for cups, plates, boxes, etc.), thermoformed products (e.g., trays, containers, moldings, etc.), housings (e.g., for electronics items, e.g., cell phones, PDA cases, music player cases, computer cases, printers, calculators, LCD projectors, connectors, chip trays, circuit breakers, plugs, and the like), wire and cable products (including, but not limited to, wire, cable and coatings for wire and cable for vehicles, cars, trucks, airplanes, aerospace, construction, military, telecommunication, utility power, alternative energy, and electronics), industrial products (such as, but not limited to, containers, bottles, drums, materials handling, gears, bearings, gaskets and seals, valves, wind turbines, and safety equipment), products for transportation (such as, but not limited to, automotive aftermarket parts, bumpers, window seals, instrument panels, consoles, under hood electrical parts, and engine covers), appliances and appliance parts (such as, but not limited to, refrigerators, freezers, washers, dryers, toasters, blenders, vacuum cleaners, coffee makers, and mixers), articles for use in building and construction (such as, but not limited to, fences, decks and rails, floors, floor covering, pipes and fittings, siding, trim, windows, doors, molding, and wall coverings), consumer goods and parts for consumer goods (such as, but not limited to, power hand tools, rakes, shovels, lawn mowers, shoes, boots, golf clubs, fishing poles, and watercraft), healthcare equipment (including, but not limited to, wheelchairs, beds, testing equipment, analyzers, labware, ostomy, IV sets, wound care, drug delivery, inhalers, and packaging). In short, the polymeric products described herein can be used to make the items currently made from conventional petroleum-based polymers.

The specific examples below are to be construed as merely illustrative, and not limitative of the remainder of the disclosure in any way whatsoever. Without further elaboration, it is believed that one skilled in the art can, based on the description herein, utilize the present invention to its fullest extent. All publications cited herein are hereby incorporated by reference in their entirety.

EXAMPLES

Biodegradable Polyester Additives

For the following examples two PHA polymers were evaluated as additives for rigid PVC polymer blends. These included copolymers of poly-3-hydroxybutyrate-4-hydroxybutyrate where the percent 4-hydroxybutyrate monomer component was either 10-12% (PHA A) or 40-50% by weight (PHA B). Other biodegradable polyester materials evaluated included polybutylene-succinate or PBS (S-EN- POL® G4560-ME272, Samsung Fine Chemicals) and polybutylene-adipate-terephthalate or PBAT (S-ENPOL® PBG7070, Samsung Fine Chemicals).

Polyvinylchloride Material

The polyvinylchloride material used in the examples was PVC 2100 (K=70) from Axiall.

Example 1. Talc Filled Rigid PVC With PHA A, PBAT or PBS Polyester Additives

In this example rigid PVC is compounded with various polyester additives and the effect on processing variables such as torque and die pressure as well as mechanical properties such as flexural modulus are described.

PVC was blended with 1 phr of MARK® 1900 (Chemtura Corp.) organotin stabilizer in a high shear mixer. This blend was then mixed with FLEXTALC® 610D (Specialty Minerals) and one of the polyester processing aids PHA A, PHA B, PBAT (ENPOL® PBG7070, Samsung Chemicals) or PBS (ENPOL® G4560-ME272) and fed to a Prism 16 mm twin screw extruder. The extruder was operated with a temperature profile of 170° C./175° C./175° C./180° C./180° C./180° C./180° C./180° C./180° C./170° C. (zones 1 to 10) at 150 rpm. The feed rate was between 4 and 6 lbs/hr. Torque was measured during extrusion of the PVC blends and is represented as the percentage of maximum shaft torque output for the extruder which was reported as 12 Nm. The extrudate was collected as strands. Pieces of strand were compression molded at 190 C in ASTM bars. ASTM bars were molded and flexural modulus measured per ASTM D-790A. Table 1 shows a summary of the PHA A formulations prepared.

TABLE 1

Summary of PVC/PHA A formulations. All component concentrations are in part-per-hundred (pph) PVC. The weight percent Talc is also given below.

| Formulation | 1 | 2 | 3 | 4 | 5 | 6 | 7 | 8 |
|---|---|---|---|---|---|---|---|---|
| PVC | 100 | 100 | 100 | 100 | 100 | 100 | 100 | 100 |
| Stabilizer | 1.0 | 1.0 | 1.0 | 1.0 | 1.0 | 1.0 | 1.0 | 1.0 |
| PHA A | 3 | 3 | 3 | 3 | 3 | 5 | 2 | 1 |
| Talc | 34 (25 wt. %) | 26 (20 wt. %) | 18 (15 wt. %) | 8.3 (7.4 wt. %) | 0 | 34 (25 wt. %) | 34 (25 wt. %) | 34 (25 wt. %) |

Duplicates of Formulations 1-5 were made where there was no polyester additive present as well as where the PHA A was substituted with either PBAT or PBS.

FIG. 1 shows a plot of die pressure versus weight percent talc in PVC when the individual polyester additives were each incorporated at a loading level of 3 pph. The plot shows that with increasing talc concentration, the die pressure during extrusion decreased when the PHA A, PBAT or PBS polyester additives were part of the formulation. The decreased die pressure especially at the higher weight percent talc concentrations with the polyester additives represented an improvement in processing of the PVC which can lead to increased extrusion rates, decreased thermal degradation and less wear and tear on the extruder pumps and gears during processing.

Figure 2:
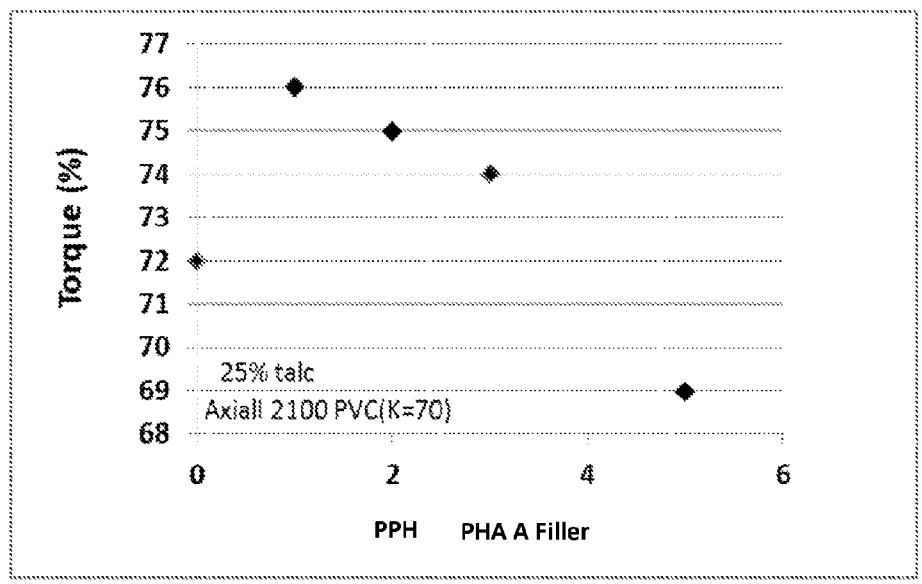
FIG. 2 is a plot of the PVC processing parameter, Torque, versus the parts-per-hundred (pph) PHA A where the talc was fixed at a high value of 25 weight % of the formulation (equivalent to 34 pph PVC).

FIG. 2 shows a plot of the PVC processing parameter torque versus the parts-per-hundred (pph) PHA A where the talc concentration was fixed at high value of 25% by weight (34 pph PVC) in the formulations. The plot shows that the PHA A was able to significantly reduce the torque during PVC processing when added at 5 pph with high concentration of talc.

Figure 3:
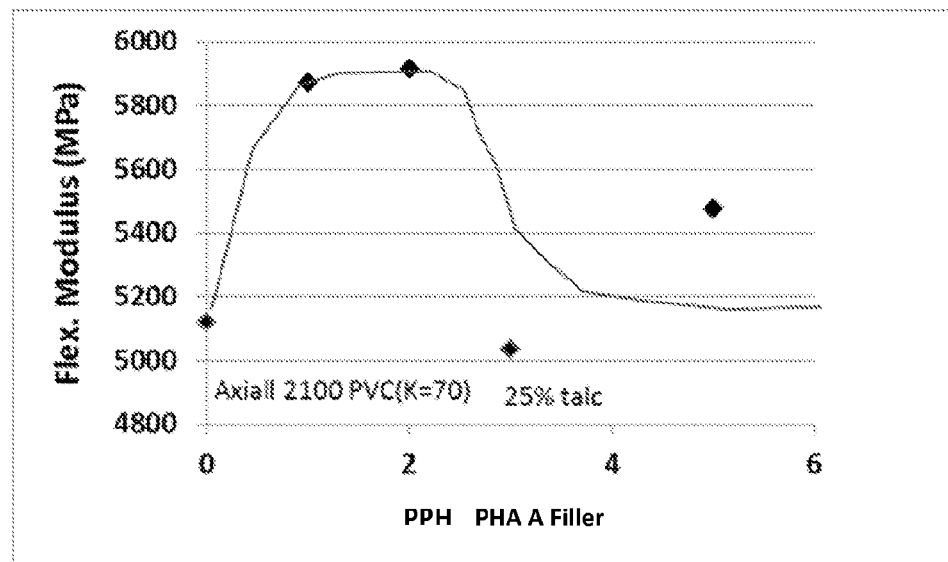
FIG. 3 is a plot of PVC Flexural modulus versus parts-per-hundred (pph) PHA A where the weight percent talc was 25% by weight of the formulation (equivalent to 34 pph PVC).

FIG. 3 shows a plot of the PVC Flexural modulus versus parts-per-hundred PHA A where the weight percent talc was again fixed at 25% by weight (34 pph PVC) for all samples. The plot shows that the Flexural modulus for the PVC formulation reached a maximum at about 1-2 pph PHA A indicating that the PHA A additive improved the PVC Flexural modulus. At talc concentrations of 0% and 15% by weight (18 pph), PHA A was also found to improve the modulus as the concentration of PHA A increased. Data for Flexural modulus versus weight % talc also showed that there was no significant decrease of the modulus when PHA A, PBAT or PBS were added at 3 pph concentration.

Example 2. Talc Filled Rigid PVC With PHA B Polyester Additive

Blends of PVC with PHA B were prepared as outlined in Example 1 having 25% by weight (34 pph) talc and 1 pph MARK® 1900 stabilizer added. The formulations for these are shown below in Table 2.

TABLE 2

Summary of PVC/PHA B blend formulations. Concentrations for the components in the Formulations are in parts-per-hundred (pph) PVC. The weight % talc is also given below.

| Formulation | 9 | 10 | 11 | 12 |
|---|---|---|---|---|
| PVC | 100 | 100 | 100 | 100 |
| Stabilizer | 1.0 | 1.0 | 1.0 | 1.0 |

TABLE 2-continued

Summary of PVC/PHA B blend formulations. Concentrations for the components in the Formulations are in parts-per-hundred (pph) PVC. The weight % talc is also given below.

| Formulation | 9 | 10 | 11 | 12 |
|---|---|---|---|---|
| PHA B | 1 | 2 | 3 | 5 |
| Talc | 34 (25 wt. %) | 34 (25 wt. %) | 34 (25 wt. %) | 34 (25 wt. %) |

Samples of each formulation were collected, molded and tested for flexural modulus as outlined in Example 1.

Figure 4:
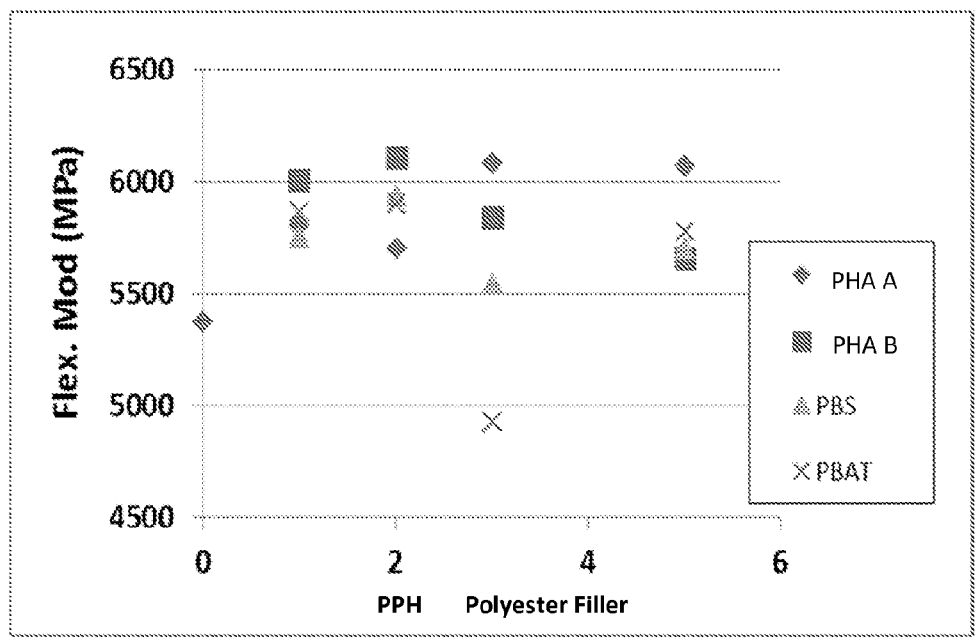
FIG. 4 compares the change in Flexural modulus with parts-per-hundred (pph) polyester in PVC when the polyester additive is PHA A, PHA B, PBAT and PBS.

FIG. 4 compares the change in flexural modulus with parts-per-hundred polyester filler (PHA A, PHA B, PBAT and PBS) in PVC. The results show that the all of the polyester additives increased the Flexural modulus of the PVC blend up to 5 pph addition. Data for torque vs. weight percent polyester additive also showed that PBAT significantly increased the torque during processing of the PVC blend by 4-5% while PHA A and PHA B tended to lower the torque value as their concentration in the PVC formulation increased. PBS showed lower torque values over all when added to the PVC.

Example 3. Processing of Rigid PVC With PHA A and PHA B Polyester Additives

In this example, rigid PVC blends were prepared with the addition of both PHA A and PHA B polyester additives. The blends processing characteristics were evaluated using a Torque Rheometer.

The PVC formulations, shown in Table 3, were first blended at 2000 rpm in a high speed mixer, which generated shear heat during the process. The PVC resin was introduced at ambient temperature to the mixer. Within 3 minutes as the shear heat built-up within the mixer, organotin stabilizer (MARK® 1900, Chemtura Corp.) was then introduced at 120° F., followed by the lubricant (calcium stearate), wax (oxidized polyethylene, Honeywell) and processing aids (PHA A and PHA B) at 140-150° F. The fillers calcium carbonate (SUPER-PFLEX® 100, Minerals Technologies) and talc (MISTRON® VAPOR R, Imerys) were then charged to the mixer at 190° F. The entire blending process was completed at a final temperature of 225-235° F. Once the blends were prepared, they were cooled to room temperature prior to further processing. About 2500 g of each formulation was then charged to a lab scale Brabender Torque Rheometer equipped with a sigma mixing blade for rheological evaluation. For all of the Formulations, the Brabender was run at 45 rpm and 180° C. The processing data output for each formulation is in the form of a continuous plot of torque versus time. From this plot, fusion time, peak torque, equilibrium torque, initial temperature (pre-fusion) and highest fusion temperature were recorded.

TABLE 3

Summary of rigid PVC/polyester additive formulations and their results for torque rheometry evaluation. Component concentrations are in parts-per-hundred (pph) PVC.

| Formulation | 1 | 2 | 3 | 4 |
|---|---|---|---|---|
| PVC | 100 | 100 | 100 | 100 |
| PHA A | 5 | 5 | 5 | 5 |
| PHA B | 4 | 4 | 4 | 4 |
| Stabilizer | 1.5 | 1.5 | 1.5 | 1.5 |
| Lubricant | 0.70 | 0.70 | 0.70 | 0.70 |
| Wax | 0.40 | 0.40 | 0.40 | 0.40 |
| CaCO$_3$ | 22.5 | 22.5 | 22.5 | 22.5 |
| Talc | 4.7 | 19.9 | 27.8 | 38.7 |
| Fusion Time (s) | 22 | 24 | 27 | 95 |
| Peak Torque (Nm) | 46 | 46 | 46 | 27 |
| Equilibrium Torque (Nm) | 19 | 19 | 19 | 16 |
| Pre-Fusion Temp. (° C.) | 177 | 178 | 178 | 183 |
| Highest Fusion Temp. (° C.) | 184 | 191 | 191 | 193 |

As shown in Table 3, the total filler content in the Formulations increased from 27.2 pph (#1) to 61.2 pph (#4). The part per hundred of PHA polyester additives remained constant at 9 pph across Formulations #1-4. The Fusion time remained low for Formulations #1-3 while at the highest filler loading for Formulation #4, the Fusion time was observed to increase while the Peak Torque and Equilibrium Torque decreased as compared to the other Formulations. This indicated that the PHA A and PHA B additives at the 27 to 61.2 pph filler loading acted as lubricating-type processing aids for rigid PVC blend formulations.

Example 4. Processing of Semi-Rigid PVC With PHA A and PHA B Polyester Additives In this example, semi-rigid PVC formulations containing the polyester additives PHA A and B were prepared as described in Example 3 and then evaluated using the Brabender Torque Rheometer. The run conditions for the Brabender were 45 rpm and 190° C. Table 4 shows a summary of the semi-rigid PVC formulations prepared and their rheology results. Note the calcium carbonate filler used in this example was MAGNUM GLOSS® M (Mississippi Lime).

TABLE 4

Summary of the formulations and rheological results for semi-rigid PVC/polyester additive blends. Component concentrations are in parts-per-hundred (pph) PVC.

| Formulation | 5 | 6 |
|---|---|---|
| PVC | 100 | 100 |
| PHA A | 5 | 5 |
| PHA B | 8 | 8.4 |
| Stabilizer | 1.4 | 1.4 |
| Wax | 1.0 | 1.0 |
| CaCO$_3$ | 35 | 35 |
| Talc | 26 | 35 |
| Fusion Time (s) | 70 | 115 |
| Peak Torque (Nm) | 28 | 27 |
| Equilibrium Torque (Nm) | 16 | 11 |
| Pre-Fusion Temp. (° C.) | 188 | 189 |
| Highest Fusion Temp. (° C.) | 196 | 213 |

The results shown in Table 4 are similar to those from Table 3 in that as the filler loading increased in the semi-rigid PVC formulations, the Fusion time increased while the Peak Torque and Equilibrium Torque decreased. These results indicate that one of the many behaviors being exhibited by the PHA polyester additives may be as lubricating-type processing aids for semi-rigid PVC materials.

Example 5. Processing of Flexible PVC With PHA A and PHA B Polyester Additives

In this example, PHA A and PHA B are added to a flexible PVC formulation with filler content varying from 39.9-72 pph PVC in order to evaluate their effect on the PVC processing conditions as well as the in process thermal stability and final mechanical properties of the flexible PVC. Included in this example is a comparative Formulation (#9) that was prepared with a commercial acrylate copolymer (ELVALOY®, Dupont™) additive used for improving mechanical property performance of flexible PVC. Included as components in the flexible PVC formulations were CITROFLEX® A4 (plasticizer, Vertellus), IRGANOX® (antioxidant, BASF), FLEXTALC® 610D (Specialty Minerals), SUPER® P-FLEX 100 (calcium carbonate, Minerals Technology) for Formulations #7 and 8, MAGNUM GLOSS® M (calcium carbonate, Mississippi Lime) for Formulation #9, barium zinc thermal stabilizer, DIDP (diisodecyl phthalate) plasticizer. The Brabender results were collected at 45 rpm and 170° C. Table 5 shows a summary of the flexible PVC Formulations and their rheology, thermal and mechanical property results.

TABLE 5

Summary of the formulations and rheological, thermal and mechanical testing results for flexible PVC/polyester additive blends. Component concentrations are in parts-per-hundred (pph) PVC.

| Formulation | 7 | 8 | 9 |
|---|---|---|---|
| PVC | 100 | 100 | 100 |
| PHA A | 4.2 | 4.1 | — |
| PHA B | 29 | 35 | — |
| ELVALOY ® | — | — | 9.6 |
| Stabilizer (BaZn) | 1.6 | 1.6 | 2.0 |
| CITROFLEX ® A4 | 22.7 | 22.7 | — |
| DIDP | — | — | 40.2 |
| Wax | 0.50 | 0.50 | 0.47 |
| Antioxidant | 1.78 | 1.80 | 2.0 |
| CaCO$_3$ | 60 | 60 | 30.1 |
| Talc | 12 | 12 | 9.8 |
| Fusion Time (s) | 13 | 10 | 18 |
| Peak Torque (Nm) | 36 | 48 | 27 |
| Equilibrium Torque (Nm) | 10 | 8 | 6 |
| Pre-Fusion Temp. (° C.) | 162 | 150 | 156 |
| Highest Fusion Temp. (° C.) | 176 | 179 | 177 |
| Shore A Hardness | 101 | — | 98.5 |
| Tensile Modulus (MPa) | 195 | — | 96.2 |
| Elongation at Break (%) | 228 | — | 159 |
| Toughness (J) | 12.81 | — | 10.00 |
| Thermal Stability | Material showed stable torque values even after 20 minutes processing | Material showed stable torque values even after 30 minutes processing | Material showed lower torque values after 16 minutes processing due to thermal degradation |

The data in Table 5 showed that the Formulations #7 and #9 were comparable in terms of their processing properties even though the total filler concentrations were almost doubled for Formulation #7 and the plasticizer level was cut in half. Formulation's #7 and #8 containing the PHA A and PHA B as processing aids showed lower Fusion times and better thermal stability and mechanical properties (tensile modulus and toughness) than that of Formulation #9 which contained the commercial PVC additive ELVALOY®. The Formulations #1-7 in Example 3-5 have shown that it is possible to substantially reduce or entirely replace the standard commercial PVC additives such as acrylic copolymers, monomeric ester lubricants and phthalate plasticizers while simultaneously maintaining or in some instances improving the rheological, thermal and mechanical properties of rigid, semi-rigid and flexible PVC formulations.

Other than in the examples herein, or unless otherwise expressly specified, all of the numerical ranges, amounts, values and percentages, such as those for amounts of materials, elemental contents, times and temperatures of reaction, ratios of amounts, and others, in the following portion of the specification and attached claims may be read as if prefaced by the word "about" even though the term "about" may not expressly appear with the value, amount, or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains error necessarily resulting from the standard deviation found in its underlying respective testing measurements. Furthermore, when numerical ranges are set forth herein, these ranges are inclusive of the recited range end points (i.e., end points may be used). When percentages by weight are used herein, the numerical values reported are relative to the total weight.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10. The terms "one," "a," or "an" as used herein are intended to include "at least one" or "one or more," unless otherwise indicated.

Any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

While this invention has been particularly shown and described with references to preferred embodiments thereof, it will be understood by those skilled in the art that various changes in form and details may be made therein without departing from the scope of the invention encompassed by the appended claims.

What is claimed is:

1. A polymer system comprising:
   poly(vinyl chloride) (PVC),
   a filler comprising a combination of talc and calcium carbonate, and
   a polyhydroxyalkanoate (PHA) additive, wherein the content of the PHA in the polymer system is from 1 pph PVC to 10 pph PVC,
   wherein the amount of the filler in the polymer system is from 25 pph to 60 pph PVC.

2. The polymer system of claim 1, wherein the PHA is a copolymer or a blend of copolymers.

3. The polymer system of claim 1, wherein the PHA comprises a copolymer of poly-3-hydroxybutytrate and one or more monomers selected from glycolic acid, lactic acid, 3-hydroxypropionic acid (3HP), 4-hydroxybutyrate (4HB), 3-hydroxyvalerate, 4-hydroxyvalerate (4HV), 5-hydroxyvalerate (5HV), 3-hydroxyhexanoate (3HH), 6-hydroxyhexanoate (6HH), 3-hydroxyoctanoate (3HO), and 3-hydroxydecanoate (3HD), wherein the monomer content is 10 to 75% of the weight of the PHA.

4. The polymer system of claim 1, wherein the PHA is a copolymer selected from poly(3-hydroxybutyrate-co-4-hydroxybutyrate), poly(3-hydroxybutyrate-co-3-hydroyvalerate), poly(3-hydroxybutyrate-co-5-hydroxyvalerate) and poly(3-hydroxybutyrate-co-6-hydroxyhexanote).

5. The polymer system of claim 4, wherein the PHA is poly(3-hydroxybutyrate-co-4-hydroxybutyrate), having a weight % of 4-hydroxybutyrate from 10% to 15% of the weight of the PHA.

6. The polymer system of claim 4, wherein the PHA is poly(3-hydroxybutyrate-co-4-hydroxybutyrate), having a content of 4-hydroxybutyrate from 40% to 50% of the weight of the PHA.

7. The polymer system of claim 1, wherein the PHA is a copolymer blend, the copolymer blend comprising a first copolymer of 3-hydroxybutyrate and 4-hydroxybutyrate, having a content of 4-hydroxybutyrate from 10% to 15% by weight of the first copolymer, and a second copolymer of 3-hydroxybutyrate and 4-hydroxybutyrate having a content of 4-hydroxybutyrate from 15% to 30% of the weight of the second copolymer.

8. The polymer system of claim 1, further comprising a stabilizer.

9. The polymer system of claim 1, further comprising a plasticizer.

10. The polymer system of claim 1, wherein the filler is present in the system from 25 pph to 50 pph PVC.

11. The polymer system of claim 1, wherein the filler is present in the system from 25 pph to 40 pph PVC.

12. The polymer system of claim 1, further comprising one or more additional additives selected from plasticizers, peroxide initiators, clarifiers, nucleating agents, thermal or oxidative stabilizers, anti-slip agents, compatibilizers, or a combination thereof.

13. An article comprising the polymer system of claim 1.

14. A method of preparing a polymer system comprising poly(vinyl chloride), a non-petroleum based filler, and a polyester additive, wherein the polymer system is highly filled comprising the step of:

melt blending the composition of claim 1, using a single screw extruder, twin screw extruder, two-roll mill or Banbury mixer thereby forming the polymer system.

\* \* \* \* \*